US012588097B2

(12) United States Patent
Gupta et al.

(10) Patent No.: US 12,588,097 B2
(45) Date of Patent: Mar. 24, 2026

(54) DATA TRANSMISSION IN AN INACTIVE STATE

(71) Applicant: Apple Inc., Cupertino, CA (US)

(72) Inventors: Vivek G. Gupta, San Jose, CA (US); Sridhar Prakasam, Woodside, CA (US)

(73) Assignee: Apple Inc., Cupertino, CA (US)

( * ) Notice: Subject to any disclaimer, the term of this patent is extended or adjusted under 35 U.S.C. 154(b) by 430 days.

(21) Appl. No.: 17/862,263

(22) Filed: Jul. 11, 2022

(65) Prior Publication Data

US 2023/0040675 A1    Feb. 9, 2023

Related U.S. Application Data

(60) Provisional application No. 63/230,525, filed on Aug. 6, 2021.

(51) Int. Cl.
H04W 76/27    (2018.01)
H04W 68/00    (2009.01)
H04W 76/30    (2018.01)

(52) U.S. Cl.
CPC ......... H04W 76/27 (2018.02); H04W 68/005 (2013.01); H04W 76/30 (2018.02)

(58) Field of Classification Search
CPC .... H04W 76/27; H04W 76/30; H04W 68/005
See application file for complete search history.

(56) References Cited

U.S. PATENT DOCUMENTS

| | | | | |
|---|---|---|---|---|
| 2020/0053791 A1* | 2/2020 | Ozturk | .............. | H04W 74/0833 |
| 2021/0337371 A1* | 10/2021 | Ianev | .................... | H04W 48/16 |
| 2021/0337602 A1* | 10/2021 | Liu | ........................ | H04W 76/27 |
| 2021/0337625 A1* | 10/2021 | Tsai | ....................... | H04W 76/27 |
| 2022/0201659 A1* | 6/2022 | Agiwal | ................. | H04W 72/04 |
| 2023/0180223 A1* | 6/2023 | Tseng | .................... | H04W 76/27 |
| | | | | 370/329 |

(Continued)

FOREIGN PATENT DOCUMENTS

| | | |
|---|---|---|
| WO | 2020087280 A1 | 5/2020 |
| WO | 2021150015 A1 | 7/2021 |

OTHER PUBLICATIONS

R2-2102841 (IDS cited) (Year: 2021).*

(Continued)

*Primary Examiner* — Guoxing Fan
(74) *Attorney, Agent, or Firm* — Kilpatrick Townsend & Stockton LLP

(57)    ABSTRACT

The present application relates to small data transmission (SDT). In an example, SDT is available for transferring information between a UE and a network, where a NAS layer of the UE is in a 5GMM-CONNECTED mode with an RRC inactive indication and an AS layer of the UE is in an RRC_INACTIVE state. To do so, the UE can be pre-configured to classify the information as qualifying for SDT. In addition, resources can be pre-configured for the SDT. For instance, the UE can maintain a set of radio bearers in a suspended state. While the NAS layer is in the 5GMM-CONNECTED mode with the inactive indication and the AS layer is in the RRC_INACTIVE state, one or more of the pre-configured resources can be used to transmit the information between the UE and the network.

19 Claims, 15 Drawing Sheets

(56) References Cited

U.S. PATENT DOCUMENTS

2023/0262814 A1* 8/2023 Agiwal ................. H04W 76/27
                                                      370/329
2023/0413371 A1* 12/2023 Godin ................. H04W 12/106
2024/0188177 A1* 6/2024 Yue ....................... H04W 74/08
2024/0276586 A1* 8/2024 Lee ....................... H04W 76/27

OTHER PUBLICATIONS

R3-210192 (IDS cited) (Year: 2021).*
3rd Generation Partnership Project; Technical Specification Group Core Network and Terminals; Non-Access-Stratum (NAS) protocol for 5G System (5GS); Stage 3 (Release 16), 3GPP TS 24.501 V16.9.0, Jun. 2021, 730 pages.
3rd Generation Partnership Project; Technical Specification Group Radio Access Network; NR; Radio Resource Control (RRC) protocol specification (Release 16), 3GPP TS 38.331 V16.5.0, Jun. 2021, 959 pages.
Discussion on Support of Small Data Transmission in Inactive State, 3GPP TSG-RAN WG3 #111-e, Rapporteur (ZTE), R3-210192, Jan. 25-Feb. 4, 2021, 13 pages.
Signalling and NAS-AS Interaction for SDT, 3GPP TSG RAN WG2 Meeting #113bis-e, Intel Corporation, R2-2102841, Apr. 12-20, 2021, 13 pages.
European Patent Application No. 22183156.3, Extended European Search Report, Dec. 21, 2022, 13 pages.
"Consideration on CP Issues", 3rd Generation Partnership Project, Technical Specification Group, Radio Access Network, Working Group 2 Meeting #114 Electronic, R2-2105281, May 19-27, 2021, 7 pages.
"Discussion on NAS Impact of Small Data Transmission", Huawei, 3rd Generation Partnership Project, Technical Specification Group, Working Group 1, Meeting #130-e, C1-213396, May 20-28, 2021, 4 pages.
European Patent Application No. 22183156.3, "Office Action", Jul. 30, 2025, 9 pages.

* cited by examiner

600

Determining, while a non-access stratum (NAS) layer of the UE is in a fifth generation mobility management (5GMM)-CONNECTED mode with a radio resource control (RRC) inactive indication and an access stratum (AS) layer of the UE is in a RRC_INACTIVE state, that information is to be transferred to or from a network 602

Transferring, while the NAS layer is in the 5GMM-CONNECTED mode with the RRC inactive indication and the AS layer is in the RRC_INACTIVE state, the information to or from the network based on a configuration defined for the NAS layer in the 5GMM-CONNECTED mode with the RRC inactive indication and the AS layer in the RRC_INACTIVE state 604

Determining, after transferring the information, that the NAS layer is to remain in the 5GMM-CONNECTED mode with the RRC inactive indication and the AS layer is to remain in the RRC_INACTIVE state 606

Maintaining, after transferring the information, the NAS layer in the 5GMM-CONNECTED mode with the RRC inactive indication and the AS layer in the RRC_INACTIVE state 608

Receiving SDT Configuration 802

Transitioning AS to RRC_INACTIVE state 804

Receiving paging message for DL SDT 806

Transitioning data radio beaer(s) to resumed state 808

Receiving downlink data 810

1000

Receiving SDT Configuration 1002

Transitioning AS to RRC_INACTIVE state 1004

Sending/receiving SDT information 1006

Receiving indication to terminate SDT 1008

Transitioning AS to RRC_CONNECTED state 1010

Figure 11:
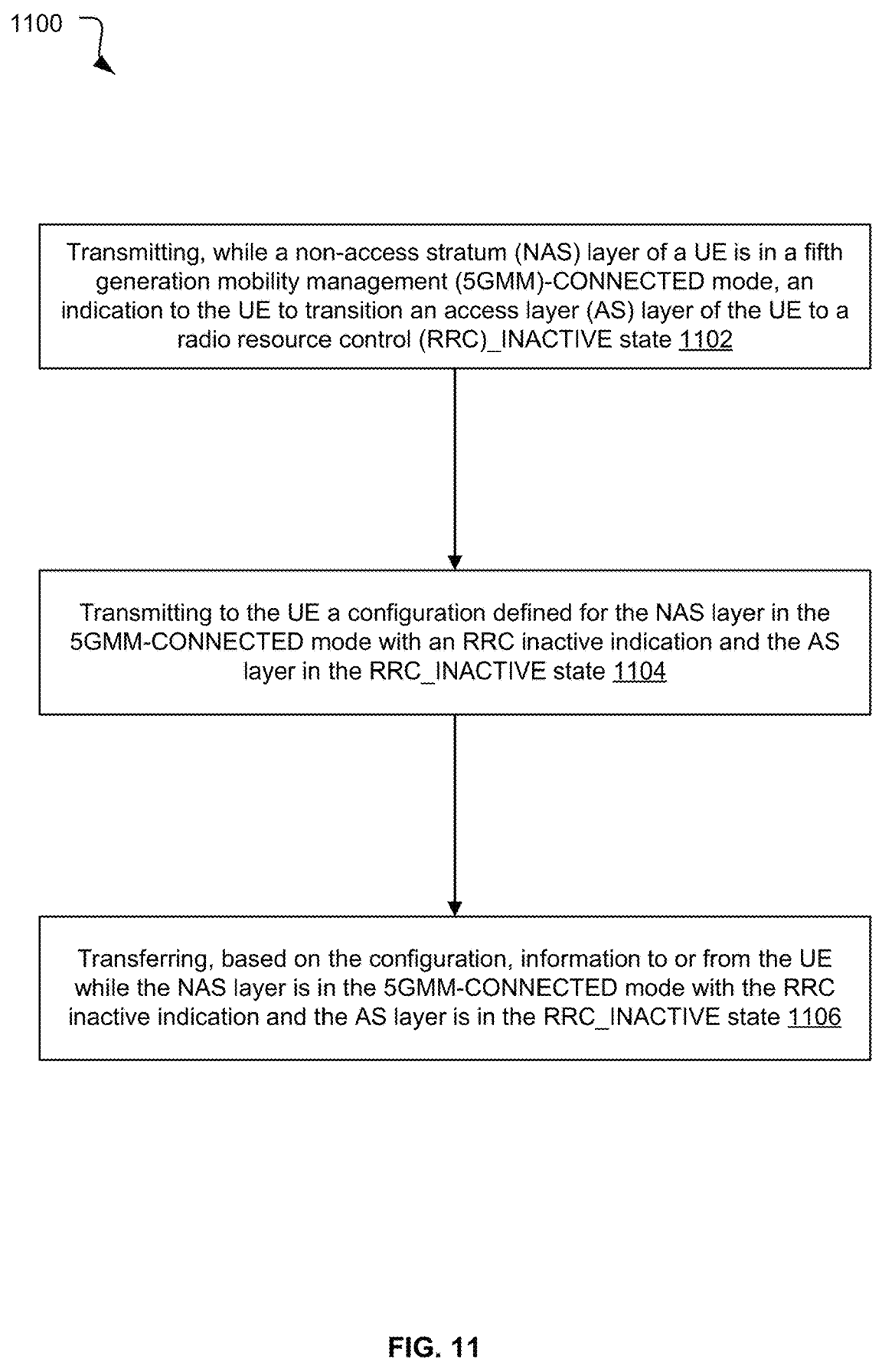

1100

Transmitting, while a non-access stratum (NAS) layer of a UE is in a fifth generation mobility management (5GMM)-CONNECTED mode, an indication to the UE to transition an access layer (AS) layer of the UE to a radio resource control (RRC)_INACTIVE state 1102

Transmitting to the UE a configuration defined for the NAS layer in the 5GMM-CONNECTED mode with an RRC inactive indication and the AS layer in the RRC_INACTIVE state 1104

Transferring, based on the configuration, information to or from the UE while the NAS layer is in the 5GMM-CONNECTED mode with the RRC inactive indication and the AS layer is in the RRC_INACTIVE state 1106

DATA TRANSMISSION IN AN INACTIVE STATE

CROSS-REFERENCE TO RELATED APPLICATION

This application claims the benefit of U.S. Provisional Patent Application No. 63/230,525, filed Aug. 6, 2021, which is herein incorporated by reference in its entirety for all purposes.

BACKGROUND

Third Generation Partnership Project (3GPP) Technical Specifications (TSs) define standards for wireless networks. These TSs define operation of 5G systems (5GS) that provide data connectivity and services.

BRIEF DESCRIPTION OF THE DRAWINGS

FIG. 6 illustrates an example of an operational flow/algorithmic structure for supporting data transmission while a UE is in a connected mode and an inactive state, in accordance with some embodiments.

FIG. 11 illustrates another example of an operational flow/algorithmic structure for supporting data transmission while a UE is in a connected mode and an inactive state, in accordance with some embodiments.

DETAILED DESCRIPTION

Figure 1:
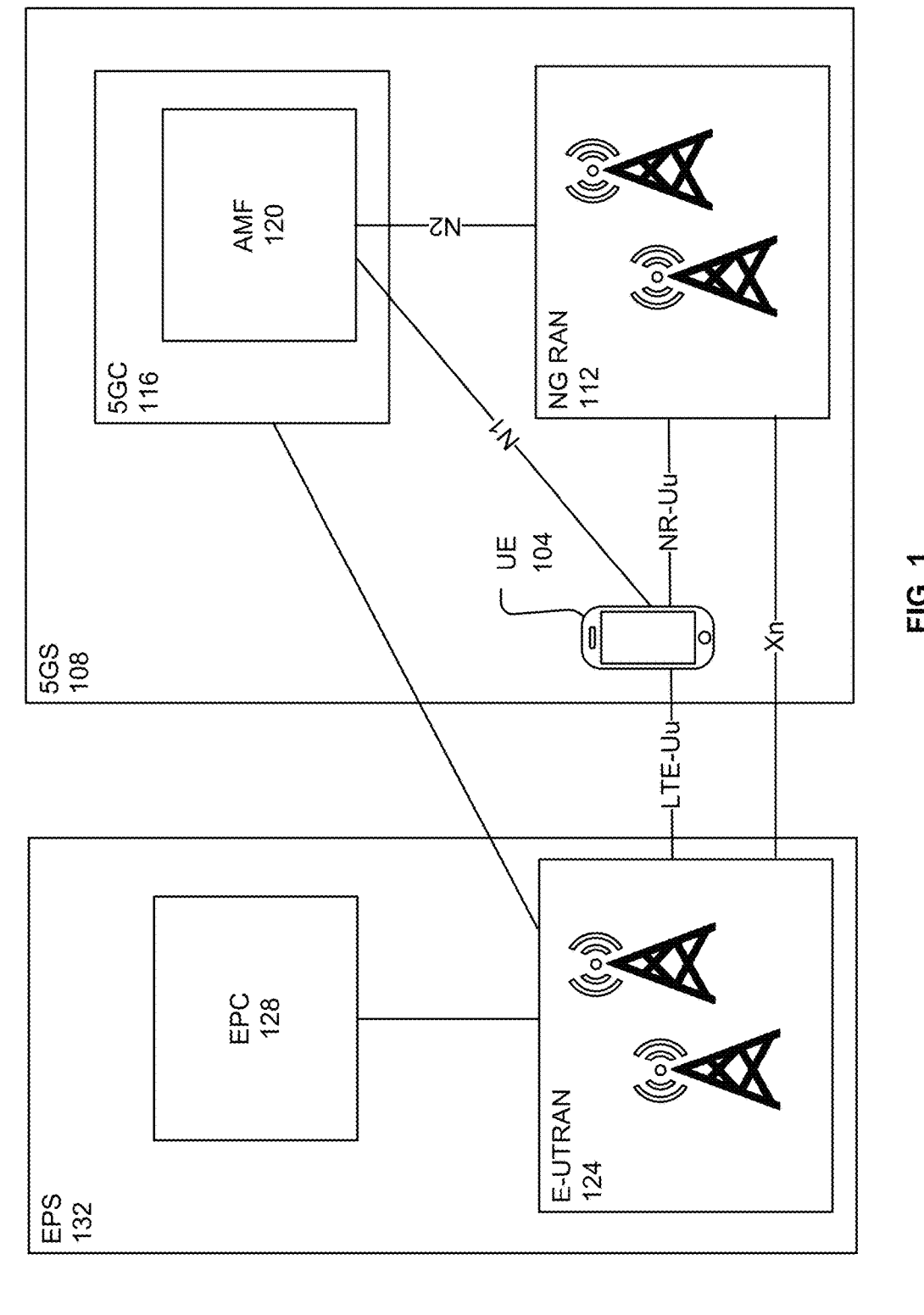
FIG. 1 illustrates a network environment, in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Generally, a user equipment (UE) can communicate information with a network that includes, for example, a base station and a core network. The information can be signaling information carried over a set of signaling radio bearers (SRBs). Additionally or alternatively, the information can be traffic data (e.g., user data) carried over a set of data radio bearers (DRBs). In both cases, the UE can operate in a connected mode, such as the UE non-access stratum (NAS) in a fifth generation mobility management (5GMM)-CONNECTED mode, whereby the UE is connected to the network. Based on uplink and/or downlink traffic (or scarcity thereof), the UE can also be operating in an inactive state, such as in radio resource control (RRC)_INACTIVE state at the UE access stratum (AS) and the 5GMM-CONNECTED mode with an inactive indication at the UE NAS, whereby no traffic may be transmitted between the UE and the network despite the UE being in the connected mode. The inactive state can enable the UE to reduce its power consumption and its processing burden. Nonetheless, information having a particular classification can be transferred between the UE and the network while the UE remains in the inactive state. For instance, the information can be classified as a small data transmission (SDT) based on its size being less than a defined or configured threshold size and/or based on its priority. In this case, the network may pre-configure the UE for the transfer (e.g., reception and/or transmission), where the configuration is associated with the particular classification. Upon determining the particular classification of the information, the UE can remain in the inactive state and transmit and/or receive the information based on the pre-configured resources. For instance, for signaling information classified as SDT, the UE can transition an SRB (e.g., SRB1) to a resumed state from a suspended state and transmit the signaling information on the SRB. Similarly, for traffic data classified as SDT, the UE can transition a DRB to a resumed state from a suspended state and transmit the traffic data on the DRB. In both cases, if no radio bearer (e.g., SRB or DRB as applicable) is available for the transmission, the UE can initiate a service request procedure and the network may respond with an indication that the UE is to remain in the inactive state. Subsequently, if additional information is to be transferred and has a different classification that is unassociated with the configuration (e.g., this information can have a non-SDT classification), the UE can also initiate a service request procedure and the network may respond with an indication that the UE is to transition out of the inactive state (e.g., to an RRC-CONNECTED state). Further, the network may terminate the configuration (e.g., the usability or availability of this configuration for information transfer with the UE), whereby the UE can transition out of the inactive state based on an indication from the network about the termination. These and other features are further described in the present disclosure.

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or digital signal processors (DSPs) that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer to an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "base station" as used herein refers to a device with radio communication capabilities, that is a network node of a communications network (or, more briefly, network), and that may be configured as an access node in the communications network. A UE's access to the communications network may be managed at least in part by the base station, whereby the UE connects with the base station to access the communications network. Depending on the radio access technology (RAT), the base station can be referred to as a gNodeB (gNB), eNodeB (eNB), access point, etc.

The term "computer system" as used herein refers to any type of interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like, as used herein, refer to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 that is part of a Fifth Generation (5G) system (5GS) 108. The 5GS 108 may also include a 5G access network, for example, next generation (NG) radio access network (RAN) 112, and a 5G core network, for example, 5GC 116. The NG RAN 112 may include base stations, for example, gNBs, that provide new radio (NR) user plane and control plane protocol terminations toward the UE 104. The NG RAN 112 may be coupled with an access and mobility management function (AMF) 120 of the 5GC 116.

The components of the network environment 100 may be coupled with one another over various interfaces (or reference points) that define signaling protocols between respective components. The interfaces may include a N1 interface between the UE 104 and the AMF 120 (e.g., between a non-access stratum (NAS) layer, or NAS for brevity, of the UE with the AMF 120); an N2 interface between the NG RAN 112 and the AMF 120; an NR-Uu interface between the UE 104 and the NG RAN 112; an LTE-Uu interface between the UE 104 and an evolved universal terrestrial access network (E-UTRAN) 124; and an Xn interface between the E-UTRAN 124 and the NG RAN 112. It will be understood that these interfaces define end-to-end signaling protocols between respective components. The actual signals may traverse through other components. For example, while signals between the AMF 120 and the UE 104 may be exchanged using N1 protocols, the signals may be communicated through one or more nodes of the NG RAN 112.

The AMF 120 may be a control plane function that provides registration management, connection management, reachability management, and mobility management services. Registration management may allow the UE 104 to register and deregister with the 5GS 108. Upon registration, the UE context may be created within the 5GC 116. The UE context may be a set of parameters that identify and characterize the UE 104. The UE context may include UE identity information, UE capability information, access and mobility information, or protocol data unit (PDU) session information.

The AMF 120, and 5GS 108, in general, may perform a number of registration area management functions to allocate/reallocate a registration area to the UE 104. A registration area may include a set of tracking areas, with each tracking area including one or more cells that cover a geographical area. A tracking area is identified by a tracking area identity, which may be broadcast in the cells of a tracking area.

Connection management may be used to establish and release control plane signaling connection between the UE 104 (e.g., the NAS) and the AMF 120. Establishing a control plane signaling connection moves the UE 104 from connection management (CM)-IDLE to CM-CONNECTED.

Mobility management may be used to maintain knowledge of a location of the UE 104 within a network. Mobility management may be performed by 5GS mobility management (5GMM) sublayers of the NAS within the UE 104 and the AMF 120 to support identification, security, and mobility of the UE 104 and to provide connection management services to other sublayers.

The 5GMM sublayers may be associated with different states that are independently managed per access type (for example, 3GPP access or non-3GPP access). The 5GMM sublayers may be in a 5GMM-DEREGISTERED state if no 5GMM context has been established and the UE location is not known to the network. To establish the 5GMM context, the sublayers may engage in an initial registration, to enter the 5GMM-REGISTERED-INITIATED state and, once the initial registration is accepted, the sublayers may enter the 5GMM-REGISTERED state with a 5GMM context established. From the 5GMM-REGISTERED state, the sublayers may enter a 5GMM DEREGISTERED-INITIATED state once a deregistration is requested. Once the deregistration is accepted, the sublayers may enter the 5GMM-DEREGISTERED state. From the 5GMM-REGISTERED state, the sublayers may also enter a 5GMM-SERVICE-REQUEST-INITIATED state by initiating a service request and may re-enter the 5GMM-REGISTERED state once the service request is accepted, rejected, or fails. A service request, as used herein, may refer to both control plane and user plane service requests.

The 5GMM sublayers may have 5GMM-CONNECTED mode and a 5GMM-IDLE mode that affect how the various procedures are performed.

A 5GMM-CONNECTED mode with RRC inactive indication (or RRC suspended state) is a NAS state introduced by 3GPP to improve resume and suspend operations of an RRC connection by reducing a time taken to reactivate the suspended bearer(s) as compared to long term evolution (LTE) methods to release an RRC connection and activate the RRC connection using a service request procedure. Faster resumption or suspension of active data radio bearers (DRBs) may improve user experience and reduce usage of radio resources.

Transitions to and operations within the 5GMM-CONNECTED mode with RRC inactive indication is defined as follows:

The UE is in 5GMM-CONNECTED mode with RRC inactive indication when the UE is in:

a) 5GMM-CONNECTED mode over 3GPP access at the NAS layer; and b) RRC_INACTIVE state at the AS layer (see 3GPP TS 38.300 [27]).

The UE shall transition from 5GMM-CONNECTED mode over 3GPP access to 5GMM-CONNECTED mode with RRC inactive indication upon receiving an indication from the lower layers that the RRC connection has been suspended.

NOTE 0: Any pending procedure or uplink data packet when receiving an indication from the lower layers that the RRC connection has been suspended, triggers a request to the lower layers to transition to RRC_CONNECTED state. This is also the case when the pending procedure or uplink data packet triggered a previous request to the lower layers to transition to RRC_CONNECTED state.

If the UE in 5GMM-CONNECTED mode with RRC inactive indication receives an indication from the lower layers that the RRC connection has been suspended, the UE shall stay in 5GMM-CONNECTED mode with RRC inactive indication. The UE shall re-initiate any pending procedure that had triggered the request to the lower layers to transition to RRC_CONNECTED state, if still needed.

3GPP TS 24.501 v16.8.0 (2021-04), section 5.3.1.4.

As such, the UE 104 can operate in a 5GMM-CONNECTED mode with an RRC inactive indication (which can be thought of as a connectivity mode of the NAS layer with the AMF 120 over the signaling control plane) and in an RRC_INACTIVE state (which can be thought of as a connectivity state of the AS layer with the network over a data plane, whereby the UE 104 is not receiving and/or transmitting data). The UE 104 can also operate in the 5GMM-CONNECTED mode (which can be thought of as another connectivity state of the AS layer with the network over the data plane, whereby the UE 104 is receiving and/or transmitting data).

Generally, the UE 104 supports RRC_INACTIVE state, whereby UEs with infrequent data transmission are generally maintained by the network in the RRC_INACTIVE state. Until Rel-16 of the 3GPP technical specifications, a UE in RRC_INACTIVE state does not support data transmission. Hence, the UE has to resume the connection (i.e., move to RRC_CONNECTED state) for any downlink (DL) (mobile terminated (MT)) and uplink (UL) (mobile originated (MO)) data. Connection setup and subsequently release to RRC_INACTIVE state happens for each data transmission which results in power consumption and signaling overhead. Several applications on different UE types (e.g., smartphones, tablets, pads and other devices) use small and infrequent data traffic as described in 3GPP document RP-210870 (Mar. 26, 2021).

With Rel-17 of the 3GPP technical specifications, a proposal is under consideration for small data transmission (SDT) in RRC_INACTIVE state, where multiple UL and DL packets can be exchanged between the network and the UE without UE transitioning to RRC_CONNECTED as described in the 3GPP document RP-210870 (Mar. 26, 2021) and R2-2104644 (Jun. 6, 2021). No 3GPP definition exists for what qualifies as SDT. One possible definition is based on the information size (e.g., the size of the packet being less than predefined size, such as being smaller than a standard-defined SMS octet size). Another possible definition is based on the information priority (e.g., information with high priority, such as emergency alerts or being time sensitive) can be classified as SDT. Of course, another possible definition is a combination of both information size and information priority. As used herein, SDT information refers to information that has a classification for transmission and/or reception while the NAS of the UE 104 is in the 5GMM-CONNECTED mode with the RRC inactive indication and the AS of the UE 104 is in the RRC_INACTIVE state. This classification can be defined according to the information size, information priority, and/or any other definition adopted by 3GPP.

Because information exchange (e.g., transmit and/or receive) is to be supported while the UE's 104 NAS is in the 5GMM-CONNECTED mode with the RRC inactive indication and UE's 104 AS in the RRC_INACTIVE state, how the NAS and AS of the UE 104 supports such functionality for SDT is impacted. Assumptions are made about this support and include: the SDT is transparent to the NAS layer (e.g., the NAS is oblivious of classification of data according to size and further the NAS does not differentiate between resumption of SDT vs non-SDT resources), the UE 104 should be able to send multiple UL and DL packets as part of same SDT procedure without transitioning to RRC_CONNECTED state, switching from SDT to non-SDT should be supported. In association with this switch, unified access control (UAC) parameters may be supported.

Current 3GPP NAS-AS interactions and the legacy NAS behavior from Rel-16 has several shortcomings to support SDT and non-SDT. For example, in legacy NAS (Rel-16), NAS cannot do any data transfer in 5GMM_CONNECTED mode with inactive indication, whereas SDT is to be performed for multiple UL and DL packets transferred in inactive state without the UE transitioning to RRC_CONNECTED. In legacy NAS (Rel-16), when a UE needs to transfer any new uplink data or initiate any new procedure, the UE NAS triggers a request to lower layers to transition to RRC_CONNECTED state by initiating a service request procedure. When the AS sends an indication to UE NAS of its transition to RRC_CONNECTED state, the UE NAS transitions to 5GMM-CONNECTED mode and can initiate UL (MO) data transfer. However, for SDT, the AS needs to remain in RRC_INACTIVE state and the UE NAS in 5GMM-CONNECTED mode with inactive indication. In addition, NAS is not aware of SDT configuration. Regarding switching from SDT to non-SDT transfers, if UL data is pending for non-SDT DRBs another service request procedure would be initiated based on legacy behavior. In view of these shortcomings, the present disclosure describes a behavior of the UE and the network (e.g. 5GS 108) for supporting SDT.

Figure 2:
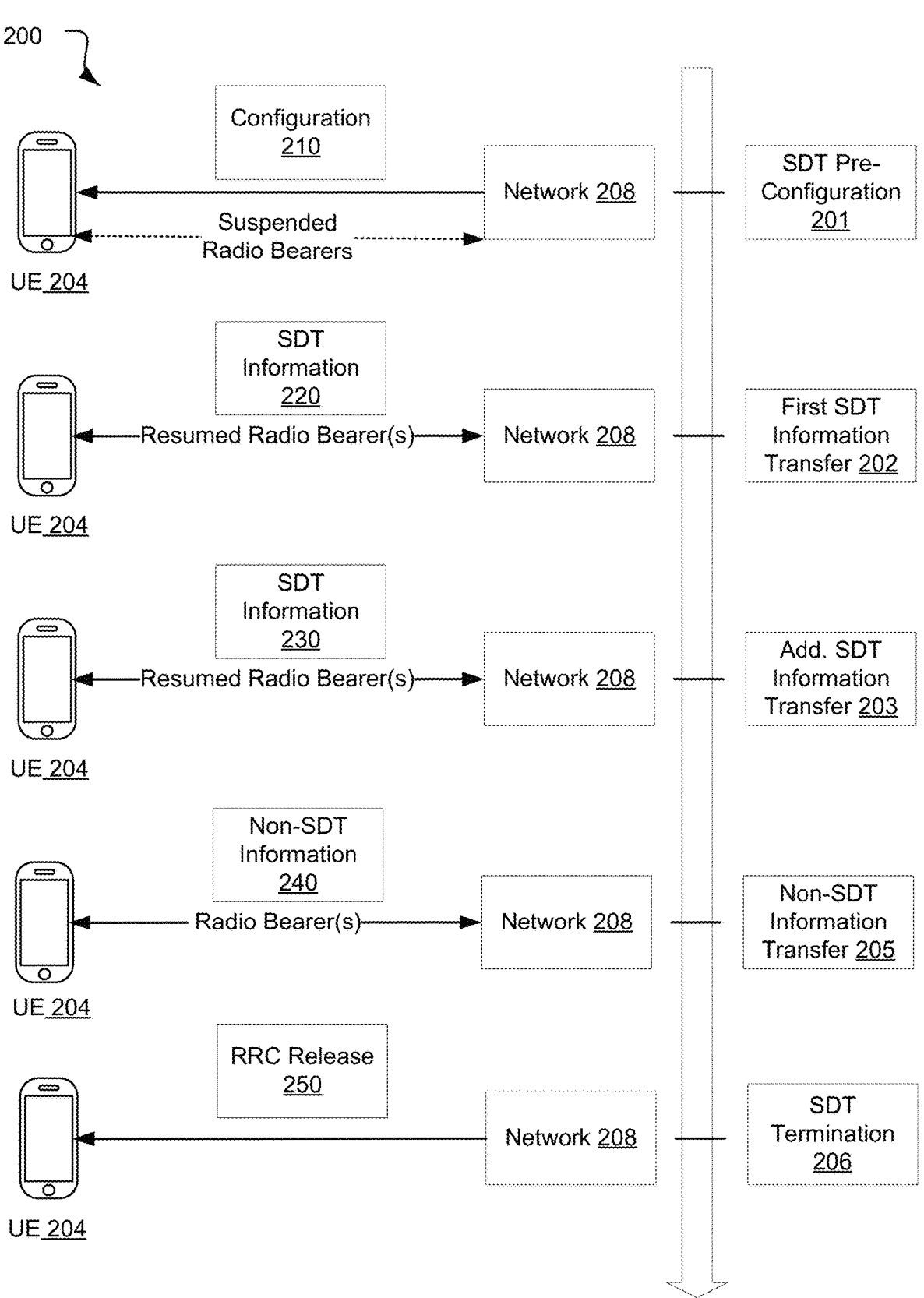
FIG. 2 illustrates an example of steps for supporting data transmission while a user equipment (UE) is in a connected mode and an inactive state, in accordance with some embodiments.

FIG. 2 illustrates an example of steps 200 for supporting data transmission while a UE 204 is in a connected mode and an inactive state, in accordance with some embodiments. The UE 204 is an example of the UE 104, and 5GMM-CONNECTED mode and RRC_INACTIVE state are examples of the connected mode and the inactive state. To provide the support, the network 208 can preconfigure 201 to support SDT by sending configuration information 210 to the UE 204. Subsequently, a first SDT information transfer 202 may occur and involve SDT information 220 being transmitted from the UE 204 to the network 208 (e.g., uplink signaling information or uplink data that are classified for SDT) or from the network 208 to the UE 204 (e.g., downlink data that is classified for SDT). In both cases, the UE 204 remains in the 5GMM-CONNECTED mode and RRC_INACTIVE state. This transfer 202 is enabled by the confirmation information 210 whereby, for example, resources (including radio bearers) are pre-configured for the UE 204 to support the transfer 202 without transitioning to an RRC_CONNECTED state. Additional information transfer 203 can also occur, while the UE 204 remains in the 5GMM-CONNECTED mode and RRC_INACTIVE state. This transfer 203 can include the transmission of additional information classified for SDT from the UE 204 to the network 208 or from the network 208 to the UE and can involve the same set of resources or, if needed, additional resources that have pre-configured for the SDT in the RRC_INACTIVE state. A non-SDT information transfer 205 (e.g., transmission to/from the UE 204 of information 240 that is not classified for SDT). In this case, the UE 204 may switch from SDT to non-SDT and this switch can involve a transition to the RRC_CONNECTED state. Alternatively or additionally, the network 208 can indicate an SDT termination 206 to the UE 204, whereby the UE 204 determines that for any subsequent information transfer (including for information that would have qualified for SDT) needs to performed while the UE is in the RRC_CONNECTED state. Each of these features is further described herein next.

Prior to the SDT pre-configuration 201, the UE's 204 NAS may be operating in the 5GMM-CONNECTED mode and UE's 204 AS in the the RRC_CONNECTED state. Subsequently, the network 208 based on different factors, including UL or DL traffic, can indicate to the UE's 204 NAS to transition to 5GMM-CONNECTED mode with RRC inactive indication and the UE's 204 AS to transition to the RRC_INACTIVE state. Along with or included in this indication, the network 208 can send the configuration information 210 to the UE 204. This configuration information 210 can indicate at least one of information size, information priority, and/or number of radio bearers to be associated with the SDT. The information size can be used by the UE 204 to determine whether information can be classified for the SDT. Similarly, the information priority can be used by the UE 204 to determine whether the information can be classified for the SDT. In these two examples, the SDT classification uses the information size and the information priority as the definition used in classifying the information. Of course, if another definition is used, the indication of this definition can be included in the configuration information 210. Additionally or alternatively, the information priority can be associated with radio bearers, whereby the information can be transmitted on a particular radio bearer depending on the priority. The radio bearers can include SRBs and DRBs. Generally, when the UE's 204 AS transitions to the RRC_INACTIVE state, SRBs and DRBs are suspended except for signaling radio bearer zero (SRB0). The configuration information 210 can indicate the number of SRBs and DRBs to be suspended (and/or to be terminated). Accordingly, the UE 204 transitions to the RRC_I-NACTIVE state, suspends the indicated number of SRBs and DRBs, terminates the remaining ones (except for SRB0 that is kept in an active state), and stores a definition for qualifying information for SDT and for the priority of SDT.

In support of the first SDT information transfer 202, the UE 204 can transmit or receive the SDT information 220. For the transmission, the UE 204 can classify uplink information as qualifying for SDT, determine its priority, select one or more of the suspended radio bearers, and transition the selected radio bearer(s) to a resumed state from the suspended state, and transmit the SDT information on the resumed radio bearer(s). For the reception, the UE 204 can receive a paging message from the network 208 indicating that SDT DL data is scheduled for transmission to the UE 204. Here also, the UE 204 can resume one or more suspended radio bearer(s) for the reception of the SDT DL data.

In support of the additional SDT information transfer 203, the UE 204 can similarly transmit and/or receive the SDT information 220 using resumed radio bearers. The same or different resumed bearers used for the first SDT information transfer 202 can be used. Further, in certain situations, additional radio bearers may be needed and may not have been pre-configured. In this case, the UE 204 can initiate a service request procedure and the network 208 may respond with an indication that the UE's 204 AS is to remain in the RRC_INACTIVE state. This response can also configure the additional radio bearers to use.

In support of the non-SDT information transfer 205, the UE can determine if non-SDT resources (including, for example, non-SDT radio bearers) have been pre-configured based on the configuration information 210. If so, these non-SDT resources can be used for the transmission of the non-SDT information 240 from or to the UE 240. In this case, the UE 204 can transition to the RRC_CONNECTED state and use the non-SDT radio bearers for the non-SDT information transfer 204. Otherwise, the UE 204 can initiate a service request procedure and the network 208 may respond with an indication that the UE 204 is to transition to the RRC_CONNECTED state. This response can also configure the non-SDT radio bearers to use. Further, the same UAC parameters that was used for the SDT information transfer 201 and/or 202 can be used for the non-SDT information transfer 205.

In an example, the SDT termination 206 can be triggered by the network 208 based on a set of factors (e.g., amount of DL traffic or UL traffic with the UE 204, priority of the traffic, etc.). The network 208 can send an RRC release message 250 to the UE 204 indicating that the configuration for the SDT transmission is no longer usable or available. In this case, the UE 204 can terminate any suspended radio bearers and remain in the RRC_INACTIVE state, or can transition to the RRC_CONNECTED state.

Figure 3:
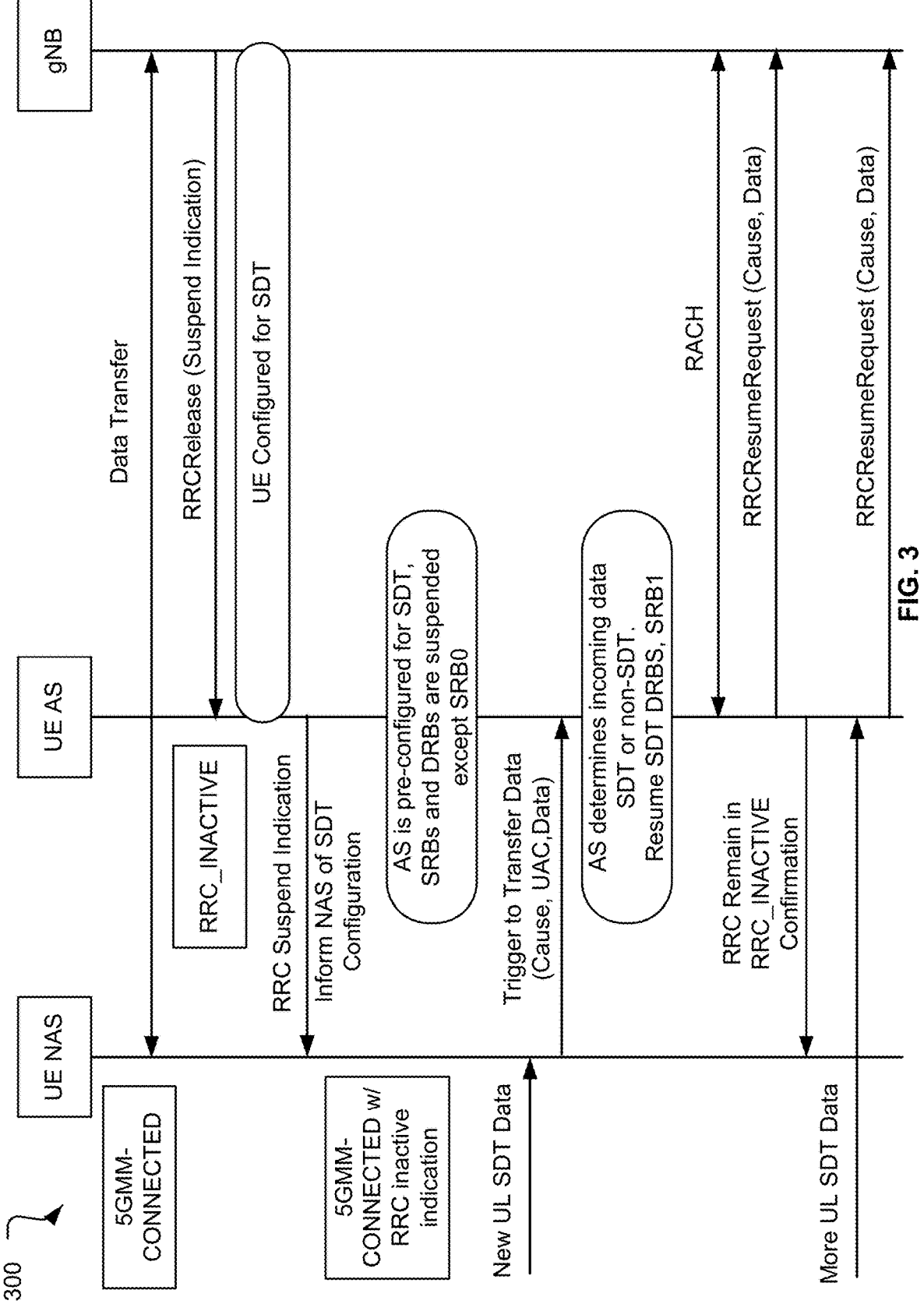
FIG. 3 illustrates an example of a sequence diagram for a short data transmission (SDT), in accordance with some embodiments.

FIG. 3 illustrates an example of a sequence diagram 300 for an SDT, in accordance with some embodiments. This sequence diagram 300 includes illustrative steps that may be performed by a UE and a network (e.g., the UE 204 and the network 208) in support of an SDT pre-configuration, a first SDT information transfer, and additional SDT information transfer.

As illustrated, the UE has a NAS layer and an AS layer (shown as UE NAS and UE AS) that can communicate with the network. The UE NAS is initially in a 5GMM-CON-NECTED mode and the UE AS is initially in an RRC_CO-NNECTED state, whereby data is transferred between the UE and gNB. Signaling data is sent from/to the UE NAS and can be referred to herein as NAS signaling information. UL data is sent from the UE AS and DL data is received by the UE AS. Subsequently, a gNB of the network sends a suspend indication to the UE AS (e.g., to an RRC layer of the UE AS) and this indication can include an RRCRelease message. Configuration information for configuring the UE to support SDT while the UE NAS in the 5GMM-CONNECTED mode and the UE AS is in the RRC_INACTIVE state can be included in the RRCRelease message or another RRC message. In response, the UE AS transitions to the RRC_INAC-TIVE state and suspends SRBs and SDT DRBs, except SRB0. Further, the UE sends an indication of the RRC suspend to the UE NAS. This indication can also inform the UE NAS of the SDT configuration such that the UE NAS can become aware of the UE AS's support of the SDT while in the RRC_INACTIVE state.

Next, new UL SDT data is available for transmission from the UE. As such, when uplink data arrives (e.g., from an application on the UE), the UE NAS just passes it to UE AS based on the UE NAS being aware of the SDT configuration. In an example, passing the UL data can include sending a trigger to the UE AS from the UE NAS to transfer the data to the gNB. This can be just a trigger to transfer UL data rather than an initiation of a service request procedure. The UE AS (e.g., a service data adaptation protocol (SDAP) layer thereof) classifies the incoming data as SDT or non-SDT based on size of data and possibly other parameters (e.g., its priority). A priority scheme can be assigned to data as well based on available/configured DRBs. The UE AS resumes the pre-configured SDT DRBs along with SRB1 which were in a suspended state. The first UL SDT message is carried by MSG3 for 4-step RACH, MSGA payload for 2-step RACH, and the configured grant (CG) transmission for CG. The UE AS sends an indication to the UE NAS to remain in 5GMM-CONNECTED mode with the inactive indication.

Multiple UL and DL SDT transfers can be performed thereafter. When more uplink data arrives, the UE NAS (which is anyway aware of SDT transfers) passes it to the UE AS. Here also, the UE NAS just includes a trigger to transfer data and does not initiate a service request procedure by default. The UE AS classifies the data as SDT and transfers it using already-resumed SDT DRBs. No further interaction between the UE AS and the UE NAS is needed.

Figure 4:
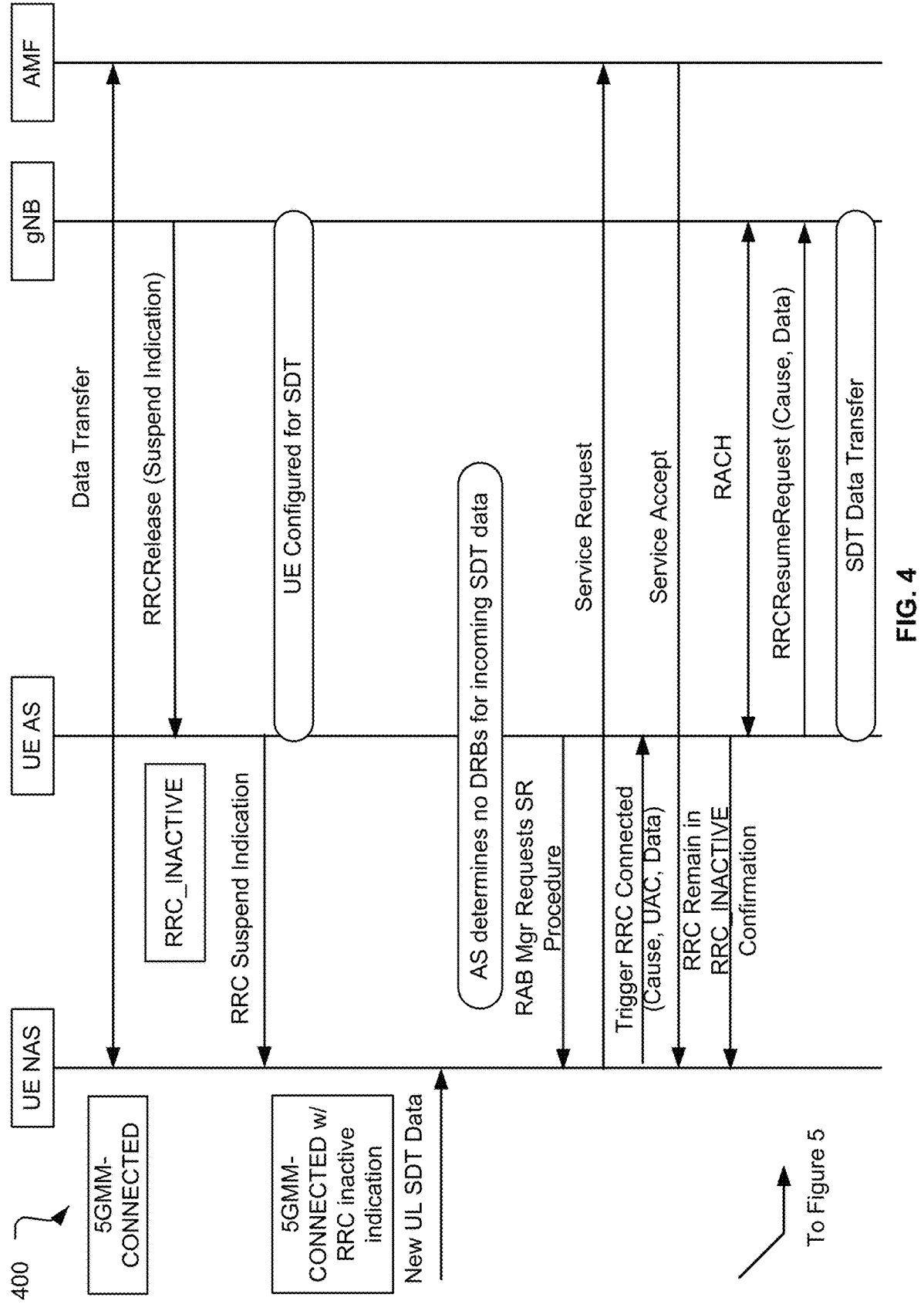
FIG. 4 illustrates an example of a first part of sequence diagram for an SDT and a non-SDT, in accordance with some embodiments.

FIG. 4 illustrates an example of a first part 400 of a sequence diagram for an SDT and a non-SDT, in accordance with some embodiments. This first part 400 includes illustrative steps that may be performed by a UE and a network (e.g., the UE 204 and the network 208) in support of an additional SDT information transfer after an SDT pre-configuration and a first SDT information transfer.

As illustrated, the UE has a NAS layer and an AS layer (shown as UE NAS and UE AS) that can communicate with the network. The UE NAS is initially in a 5GMM-CON-NECTED mode and the UE AS is initially in an RRC_CO-NNECTED state, whereby data is transferred between the UE and gNB. Signaling data is sent from/to the UE NAS to an AMF of the network via a gNB of the network. UL data is sent from the UE AS to the AMF via the gNB and DL data is received by the UE AS from the AMF via the gNB. Subsequently, the gNB sends a suspend indication to the UE AS (e.g., to an RRC layer of the UE AS) and this indication can include an RRCRelease message. Configuration information for configuring the UE to support SDT while the UE NAS in the 5GMM-CONNECTED mode with an RRC inactive indication and the UE AS is in the RRC_INAC-TIVE state can be included in the RRCRelease message or another RRC message. In response, the UE AS transitions to the RRC_INACTIVE state and suspends SRBs and SDT DRBs, except SRB0. Further, the UE sends an indication of the RRC suspend to the UE NAS. This indication can also inform the UE NAS of the SDT configuration such that the UE NAS can become aware of the UE AS's support of the SDT while in the RRC_INACTIVE state.

Next, new UL SDT data is available for transmission from the UE. As such, when uplink data arrives (e.g., from an application on the UE), the UE NAS just passes it to UE AS based on the UE NAS being aware of the SDT configuration. Here, and unlike the sequence diagram 300, the UE AS determines that no DRBs are available for the incoming SDT data. For instance, SDT DRBs are not established for any reason, established but none is available from a sus-pended state, and/or no available DRB in a suspended state is available based on a priority. In this case, a radio access bearer (RAB) manager of the UE AS can trigger the UE NAS to initiate a new service request procedure (e.g., by sending SERVICE REQUEST or CONTROL PLANE SER-VICE REQUEST to the AMF) and new DRBs are estab-lished. The UE NAS in this case triggers the UE AS to transition to the RRC_CONNECTED state. The SERVICE ACCEPT from the network may carry an indication for the UE AS to remain in the RRC_INACTIVE state and an indication of this confirmation can be passed from the UE AS to the UE NAS. The new UL data can be transferred using one or more UL SDT message carried by MSG3 for 4-step RACH, MSGA payload for 2-step RACH, and the configured grant (CG) transmission for CG. In an example, the UAC parameters used for the UL data can be the same as the ones used for the first SDT transfer (per the sequence diagram 300).

Figure 5:
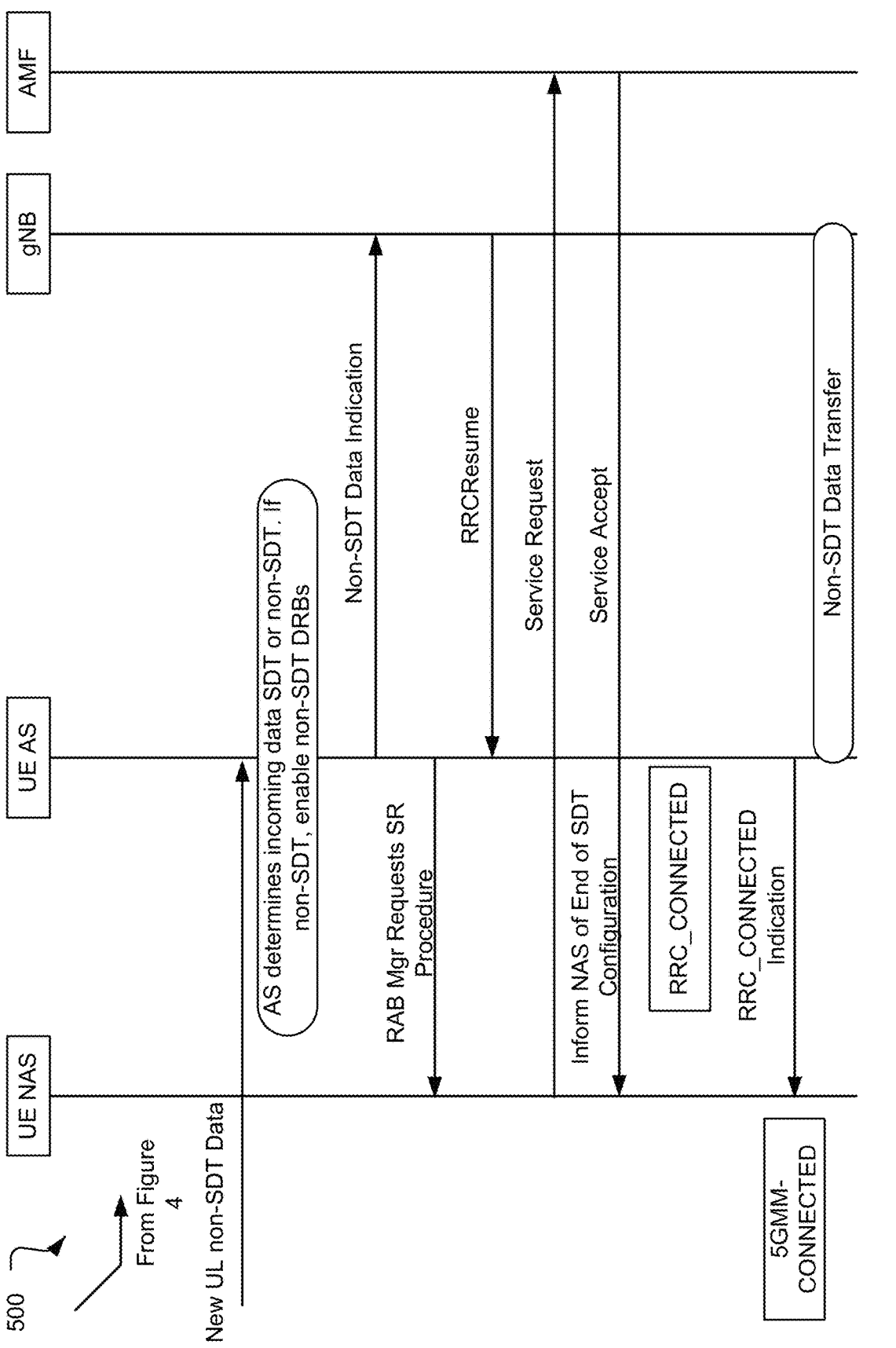
FIG. 5 illustrates an example of a second part of sequence diagram for an SDT and a non-SDT, in accordance with some embodiments.

FIG. 5 illustrates an example of a second part 500 of a sequence diagram for an SDT and a non-SDT, in accordance with some embodiments. This second part 500 includes illustrative steps that may be performed by a UE and a network (e.g., the UE 204 and the network 208) in support of non-SDT transfer after at least an SDT pre-configuration and can, optionally, follow the first part 400 described in FIG. 4.

As illustrated, the UE NAS is still operating in the 5GMM-CONNECTED mode with inactive indication and the AS in RRC_INACTIVE state. Next, new UL SDT data is available for transmission from the UE. In an example, the UE NAS just passes the new UL data to the UE AS based on the UE NAS being aware of the SDT configuration. In an example, passing the UL data can include sending a trigger to the UE AS to NAS layer includes a trigger to transfer the data to the gNB. This can be just a trigger to transfer UL data rather than an initiation of a service request procedure. The UE AS (e.g., the SDAP layer) classifies the incoming data as non-SDT based on size of data and possibly other param-eters (e.g., its priority). Based on the UL data being classi-fied as UL non-SDT data, the UE AS layer enables one or more non-SDT DRBs for the transmission. A non-SDT DRB can be a DRB that has not been configured or allocated to transfer SDT. Enabling can include determining whether a non-SDT DRB is already configured (but is in a suspended state) based on the configuration information received for SDT. If so, the non-SDT DRB can be transitioned to a resumed state. Otherwise, enabling the non-SDT DRB can involve establishing the non-SDT DRB. The establishing can include sending an non-SDT data indication to the gNB and triggering the UE NAS to initiate a service request procedure. In response, the gNB can send an RRCResume message to the UE AS such that the non-SDT DRB(s) can be established. In addition, the AMF can send a SERVICE ACCEPT message accepting the service request and inform-ing the UE NAS of an end (or termination) of the SDT configuration. The UE AS transitions to the RRC_CON-NECTED state and sends an indication about this state to the UE NAS. The UL non-SDT data can be sent over the non-SDT DRB(s). Further, when enabling non-SDT DRBs, the UE AS may inform the UE NAS of an end of SDT transfers and transition to RRC_CONNECTED so that legacy behavior in connected mode applies.

In an example, the gNB initiates the switch from SDT to non-SDT. The gNB can do so based on a number of factors, including DL information to the UE or UL information from the UE. If the gNB resumes from SDT to non-SDT the 3GPP resumption procedure to RRC_CONNECTED is applied, whereby the UE NAS is informed and the 5GMM-CON-NECTED mode is entered.

In another example, failures are handled by the UE AS and the UE AS can maintain a copy of data sent. The UE NAS is notified (e.g., by the UE AS) when every UL data transfer is completed (e.g., based on a confirmation indica-tion), so that next transfer of data can be initiated.

As explained herein above, information sent by the UE can include data and NAS signaling information. Generally, NAS signaling is treated similarly as SDT or non-SDT type data depending on message size and similar other param-eters (e.g., priority) as SDT or non-SDT data. NAS signaling message can be carried over SDT SRB depending on the size of NAS message. If no appropriate signaling radio bearers are available, a service request procedure may be initiated. However, unlike data, transmission failures are handled by the UE NAS rather than the UE AS.

Furthermore, information transmitted to the UE can include SDT DL data. When the UE is paged by the network for DL data, a special paging cause can be specified in the paging message. This cause can indicate that the DL data is SDT DL data (e.g., based on the classification of the network of the DL data). Alternatively, the cause can indicate a size of the DL data (or some other parameters) such that the classification can be performed by the UE. DRBs are used for the SDT DL data and can be resumed from a suspended state by RRC if already established (or pre-configured). If not established, a service request procedure can be initiated. In both cases, the UE NAS may receive a special indication of DL data being available.

As also explained herein above, UAC requirements can apply for all UL data from all protocol data unit (PDU) sessions, even for the SDT case. Once SDT is initiated, UAC parameters (e.g., access category and/or access identity) for subsequent UL data for non-SDT DRBs can be the same as those for UL data for SDT DRBs. However, from the UE NAS perspective, in case UL data is pending for non-SDT DRBs, the UE AS needs to request a new service request procedure for which the UE NAS performs UAC. UL NAS signaling that is categorized as SDT should set access category to MO_sig instead of MO_data.

FIGS. 6-10 illustrate examples of operational flows/algorithmic structures that can be implemented by a UE in support of SDT, in accordance with some embodiments. The operational flows/algorithmic structures of FIGS. 7-11 can represent a detailed implementation of aspects of the operational flows/algorithmic structure of FIG. 6. The UE can be, for example, the UE 104, the UE 204, or the UE 1400, or the operational flows/algorithmic structures can be implemented by components of the UE such as, for example, by processors 1404.

FIG. 6 illustrates an example of an operational flow/algorithmic structure 600 for supporting data transmission while the UE is in a connected mode and an inactive state, in accordance with some embodiments. The operation flow/algorithmic structure 600 may include, at 602, determining, while a non-access stratum (NAS) layer of the UE is in a fifth generation mobility management (5GMM)-CONNECTED mode with a radio resource control (RRC) inactive indication and an access stratum (AS) layer of the UE is in a RRC_INACTIVE state, that information is to be transferred to or from a network. For example, the information can be NAS signaling information or UL data. In this case, the UE (e.g., an AS layer thereof) can classify the information as qualifying for SDT. This classification can be based on a configuration of the UE, where the configuration is associated with the SDT. For instance, the configuration can specify an information size or other parameters (e.g., information priority) and the UE can determine that the information meets the specification (e.g., its size is smaller or equal to the information size, etc.). In another example, the information can be DL data. In this case, the UE can receive a paging message having a cause indicating that the DL data is classified as SDT data or indicating parameters of the DL data that the UE can compare to the configuration to then classify the DL data.

The operation flow/algorithmic structure 600 may include, at 604, transferring, while the NAS layer is in the 5GMM-CONNECTED mode with the RRC inactive indication and the AS layer is in the RRC_INACTIVE state, the information to or from the network based on a configuration defined for the NAS layer in the 5GMM-CONNECTED mode with the RRC inactive indication and the AS layer in the RRC_INACTIVE state. The configuration can be pre-defined prior to the information transmission or even becoming available for the transferring. For example, the relevant configuration information can be received in or along with an indication from the network for the UE to transition to the RRC_INACTIVE state while operating in the 5GMM-CONNECTED mode. This configuration can allocate resources usable for the information transfer without the need to transition to the RRC_CONNECTED state. For instance, a set of SRBs and/or DRBs can be maintained in a suspended state, while other SRB and DRBs (except for DRB0) can be terminated. The transfer can include selecting one or more of the suspended SRBs and/or DRBs (e.g., based on the type of information, its priority, its size, etc.), transitioning the selected radio bearer(s) to a resumed state, and transmitting the SDT information from or to the UE using the resumed radio bearer(s).

The operation flow/algorithmic structure 600 may include, at 606, determining, after transferring the information, that the NAS layer is to remain in the 5GMM- CONNECTED mode with the RRC inactive indication and the AS layer is to remain in the RRC_INACTIVE state. For example, the transfer does not initiate a service request procedure or, if one is initiated, the network can indicate in a response to the service request that the UE is to remain in the RRC_INACTIVE state.

The operation flow/algorithmic structure 600 may include, at 608, maintaining, after transferring the information, the NAS layer in the 5GMM-CONNECTED mode with the RRC inactive indication and the AS layer in the RRC_INACTIVE state. For example, the UE does not transition to the RRC_CONNECTED state based on the determination to remain in the RRC_INACTIVE state. In this way, subsequent transfer(s) of information classifiable as SDT information can be performed while operating in the 5GMM-CONNECTED mode and the RRC_INACTIVE state.

Figure 7:
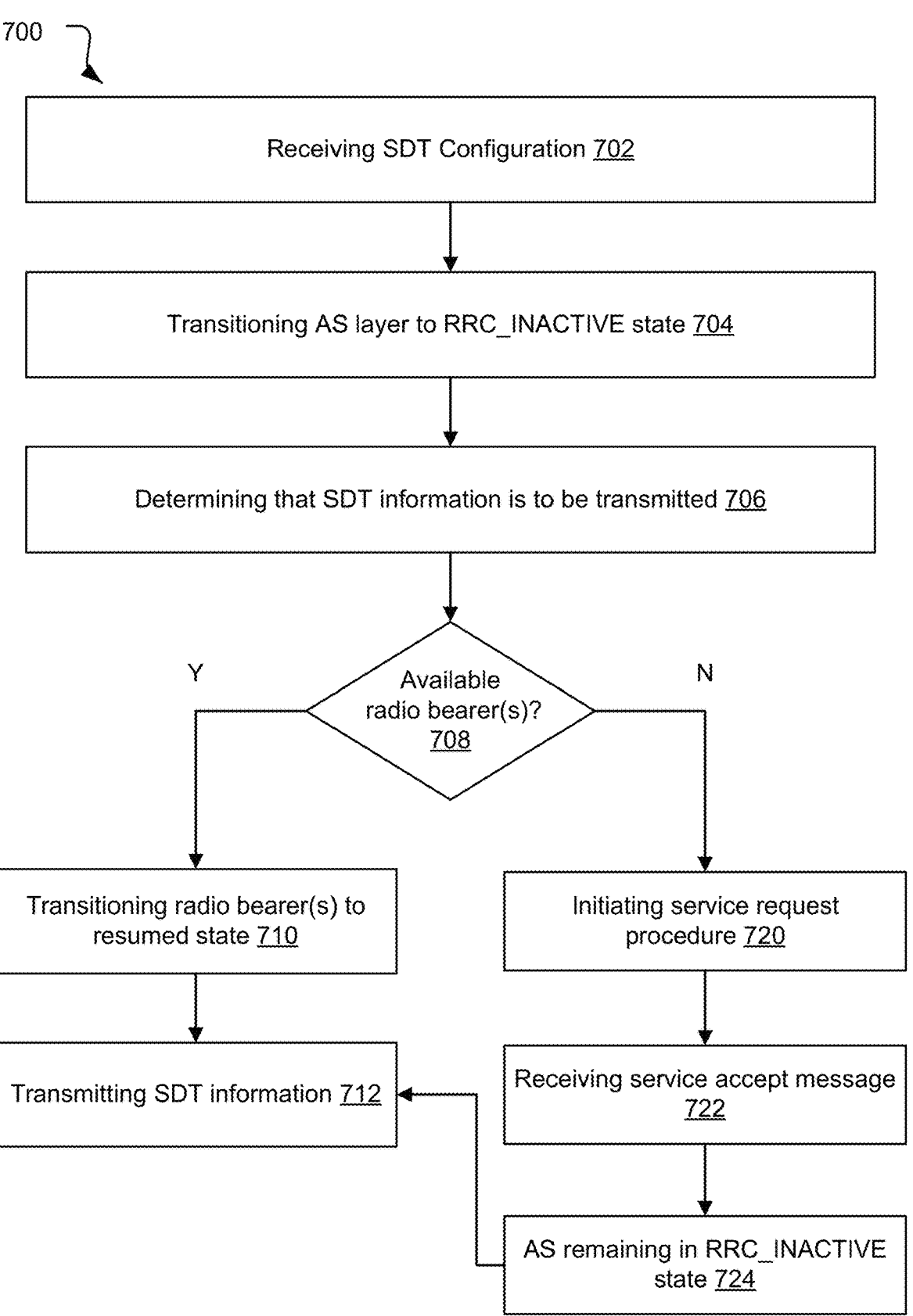
FIG. 7 illustrates an example of an operational flow/algorithmic structure for SDT using pre-configured radio bearers, in accordance with some embodiments.

FIG. 7 illustrates an example of an operational flow/algorithmic structure 700 for SDT using pre-configured radio bearers, in accordance with some embodiments. The operational flow/algorithmic structure 700 can be implemented for a first UL SDT after configuring the UE to support SDT. The operational flow/algorithmic structure 700 may include, at 702, receiving an SDT configuration. For example, an AS layer of the UE receives configuration information from the network, where the configuration information is associated with SDT. The configuration information can indicate at least of an information size, an information priority, or a number of radio bearers to suspend. The configuration information can be included in a suspend indication, such as an RRCRelease message, or received along with such an indication and can be stored by the UE.

The operational flow/algorithmic structure 700 may include, at 704, transitioning the AS layer to an RRC_INACTIVE state. For example, in response to the suspend indication, the AS layer transitions from an RRC_CONNECTED state to the RRC_INACTIVE state and indicates this transition to a NAS layer of the UE, where the NAS layer is in a 5GMM-CONNECTED mode. The NAS layer can transition to a 5GMM-CONNECTED mode with an RRC inactive indication. Further, the AS layer can suspend a number of SRBs and/or DRBS and terminate remaining radio bearers, except for SRB0 that is not suspended or terminated. This number can be the number indicated by the configuration information. Further, suspended SRBs and/or DRBs can be allocated a priority scheme based on priority information indicated by the configuration information.

The operational flow/algorithmic structure 700 may include, at 706, determining that SDT information is to be transmitted. For example, this information can include NAS signaling information or UL data. The NAS layer can trigger the AS layer to transmit information and the AS layer can classify the information as SDT information. The classification can be performed by comparing the size of the information to transmit with the information size for SDT indicated by the configuration information and/or by comparing other parameters of the information to parameters indicated by the configuration information (e.g., by comparing priorities). The comparison(s) can indicate that the information qualifies for SDT.

The operational flow/algorithmic structure 700 may include, at 708, determining whether radio bearers are available for the SDT. For example, for NAS signaling, the AS layer determines whether one or more SRBs can be resumed from the suspended state. Similarly, for UL data, the AS layer determines whether one or more DRBs can be resumed from the suspended state. In both cases, the determination can also account for a priority of the SDT information and priorities associated with the suspended radio bearers. If the relevant radio bearer(s) is (are) available, the operational flow/algorithmic structure 700 proceeds to 710. Otherwise, the operational flow/algorithmic structure 700 proceeds to 720.

The operational flow/algorithmic structure 700 may include, at 710, transitioning the radio bearer(s) to a resumed state. For example, the AS layer can select the one or more SRBs or the one or more DRBs, as applicable, and transition each from the suspended state to the resumed state. Generally, an SRB1 is resumed to carry RRC signaling indicating that UL information is transmitted to the network. This signaling can include an RRCResumeRequest message. UL data can be included in a MSG3 for 4-step RACH, MSGA payload for 2-step RACH, and the CG transmission for CG.

The operational flow/algorithmic structure 700 may include, at 712, transmitting the SDT information. For example, as applicable, the NAS signaling is transmitted over the resumed SRB(s), whereas the UL data is transmitted over the resumed DRB(s). The AS layer can also indicate to the NAS layer that the SDT information is transmitted and that the RRC_INACTIVE state of the AS layer is maintained.

The operational flow/algorithmic structure 700 may include, at 720, initiating a service request procedure. For example, because no SRB or DRB, as applicable, is available for the SDT, the AS layer can trigger the NAS layer to initiate the service request procedure. In turn, the NAS layer can send a SERVICE REQUEST or CONTROL PLANE SERVICE REQUEST message to the network.

The operational flow/algorithmic structure 700 may include, at 722, receiving a SERVICE ACCEPT message. For example, this message is received from the network (e.g., from an AMF of the network) in response to the SERVICE REQUEST or CONTROL PLANE SERVICE REQUEST message. The SERVICE ACCEPT message can indicate that the AS layer is to remain in the RRC_INACTIVE state. Further, the SERVICE ACCEPT message can enable the UE to establish the relevant radio bearer(s) for the SDT.

The operational flow/algorithmic structure 700 may include, at 724, the AS layer remaining in the RRC_INACTIVE state. For example, the AS layer does not transition to the RRC_CONNECTED state based on the SERVICE ACCEPT message. The operational flow/algorithmic structure 700 can proceed to 712, where the SDT information is transmitted over the established radio bearer(s).

Although not illustrated in FIG. 7, aspects of the operational flow/algorithmic structure 700 can be repeated for subsequent SDTs. For instance, as long as the NAS layer remains in the 5GMM-CONNECTED mode with the RRC inactive indication and the AS layer remains in the RRC_INACTIVE state and as long as information to be transmitted qualifies for SDT, 706 through 724 can be repeated to transmit this SDT information.

Figure 8:
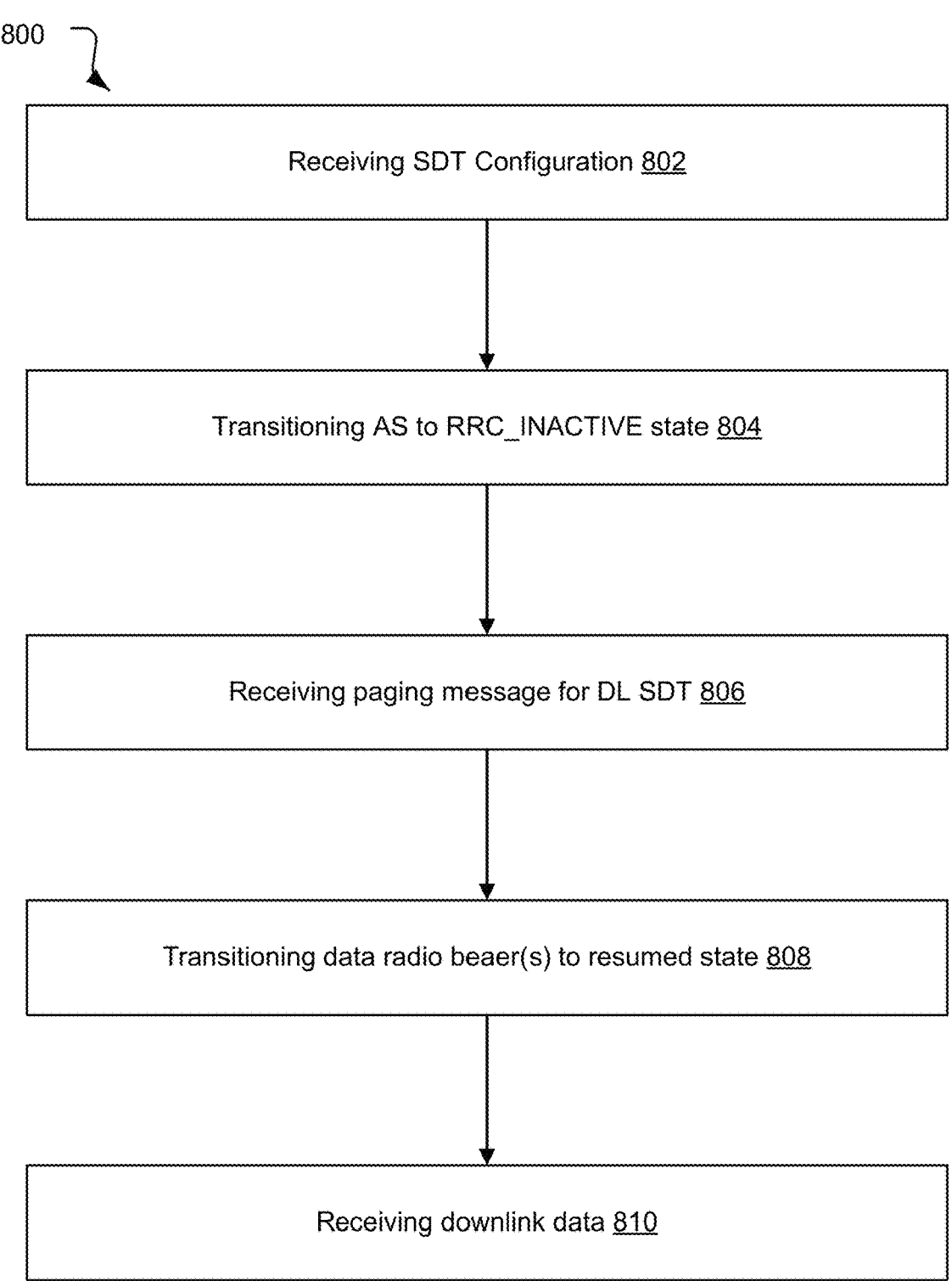
FIG. 8 illustrates another example of an operational flow/algorithmic structure for SDT using pre-configured radio bearers, in accordance with some embodiments.

FIG. 8 illustrates another example of an operational flow/algorithmic structure 800 for SDT using pre-configured radio bearers, in accordance with some embodiments. The operational flow/algorithmic structure 800 can be implemented for a DL SDT. The operational flow/algorithmic structure 800 may include, at 802, receiving an SDT configuration. For example, an AS layer of the UE receives configuration information from the network, where the configuration information is associated with SDT. The configuration information can indicate at least of an information size, an information priority, or a number of radio bearers to suspend. The configuration information can be included in a suspend indication, such as an RRCRelease message, or received along with such an indication and can be stored by the UE.

The operational flow/algorithmic structure 800 may include, at 804, transitioning the AS layer to n RRC_INACTIVE state. For example, in response to the suspend indication, the AS layer transitions from an RRC_CONNECTED state to the RRC_INACTIVE state and indicates this transition to a NAS layer of the UE, where the NAS layer is in a 5GMM-CONNECTED mode. The NAS layer can transition to a 5GMM-CONNECTED mode with an RRC inactive indication. Further, the AS layer can suspend a number of SRBs and/or DRBS and terminate remaining radio bearers, except for SRB0 that is not suspended or terminated. This number can be the number indicated by the configuration information. Further, suspended SRBs and/or DRBs can be allocated a priority scheme based on priority information indicated by the configuration information.

The operational flow/algorithmic structure 800 may include, at 806, receiving a paging message for DL SDT. For example, the paging message can be received from the network and can have a cause indicating that DL data is available for transmission to the UE. The cause can indicate that the DL data is classified as qualifying for SDT, or can include parameters about the DL data (e.g., size, priority) such that the AS layer can determine this qualification based on the stored configuration information.

The operational flow/algorithmic structure 800 may include, at 808, transitioning one or more DRBs to a resumed state. For example, the AS layer determines whether one or more pre-configured DRBs are available and can be resumed from the suspended state. This determination can also account for a priority of the SDT DL data and priorities associated with the available, suspended DRBs. The selected DRB(s) is(are) transitioned from the suspended state to the resumed state. If no DRB is available, a service request procedure can be initiated, whereby a SERVICE ACCEPT message can indicate to the AS layer to remain in the RRC_INACTIVE state and can trigger a DRB(s) to be established.

The operational flow/algorithmic structure 800 may include, at 810, receiving the DL data. For example, the AS layer receives the DL data over the DRB(s) while being in the RRC_INACTIVE state. The AS layer can also indicate to the NAS layer that DL data is received and that the RRC_INACTIVE state is maintained.

Although not illustrated in FIG. 8, aspects of the operational flow/algorithmic structure 800 can be repeated for subsequent SDTs. For instance, as long as the NAS layer remains in the 5GMM-CONNECTED mode with the RRC inactive indication and the AS layer remains in the RRC_INACTIVE state, and as long as information to be received qualifies for SDT, 806 through 810 can be repeated to transmit this SDT information.

Figure 9:
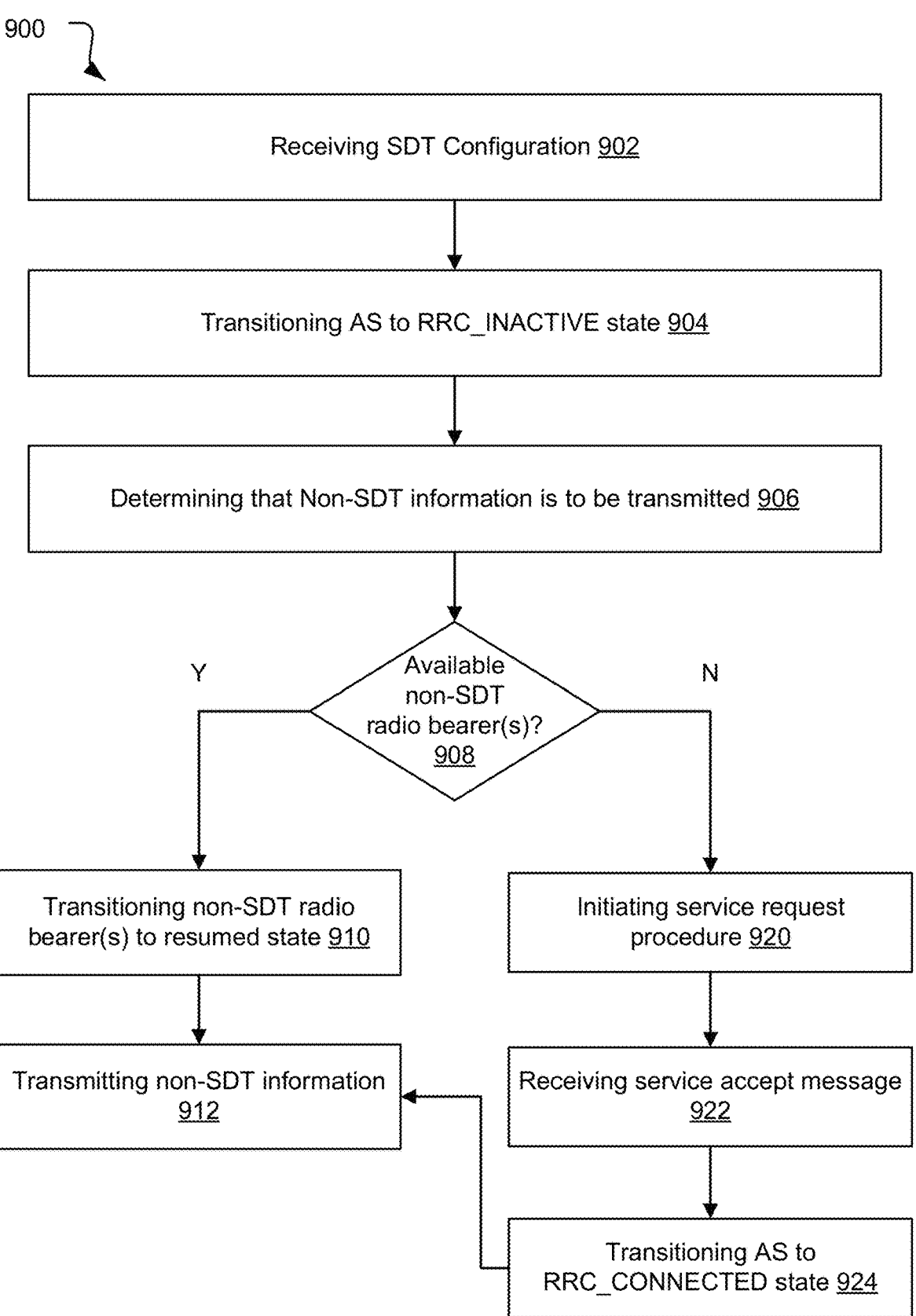
FIG. 9 illustrates yet another example of an operational flow/algorithmic structure for SDT using pre-configured radio bearers, in accordance with some embodiments.

FIG. 9 illustrates yet another example of an operational flow/algorithmic structure 900 for SDT using pre-configured radio bearers, in accordance with some embodiments. The operational flow/algorithmic structure 900 can be implemented for a SDT to non-SDT switch. The operational flow/algorithmic structure 900 may include, at 902, receiving an SDT configuration. For example, an AS layer of the UE receives configuration information from the network, where the configuration information is associated with SDT. The configuration information can indicate at least of an information size, an information priority, or a number of radio bearers to suspend. As far as the radio bearers, the configuration information can indicate that a radio bearer should be maintained in a suspended state and, optionally, the priority of this radio bearer and whether it is usable for SDT or non-SDT (in which case, it is referred to herein as non-SDT radio bearer). The configuration information can be included in a suspend indication, such as an RRCRelease message, or received along with such an indication and can be stored by the UE.

The operational flow/algorithmic structure 900 may include, at 904, transitioning the AS layer to an RRC_I-NACTIVE state. For example, in response to the suspend indication, the AS layer transitions from an RRC_CON-NECTED state to the RRC_INACTIVE state and indicates this transition to a NAS layer of the UE, where the NAS layer is in a 5GMM-CONNECTED mode. The NAS layer can transition to a 5GMM-CONNECTED mode with an RRC inactive indication. Further, the AS layer can suspend a number of SRBs and/or DRBS and terminate remaining radio bearers, except for SRB0 that is not suspended or terminated. This number can be the number indicated by the configuration information. Further, suspended SRBs and/or DRBs can be allocated a priority scheme based on priority information indicated by the configuration information.

The operational flow/algorithmic structure 900 may include, at 906, determining that non-SDT information is to be transmitted. For example, this information can include NAS signaling information or UL data. The NAS layer can trigger the AS layer to transmit information and the AS layer can classify the information as non-SDT information. The classification can be performed by comparing the size of the information to transmit with the information size for SDT indicated by the configuration information and/or by comparing other parameters of the information to parameters indicated by the configuration information (e.g., by comparing priorities). The comparison(s) can indicate that the information does not qualify for SDT.

The operational flow/algorithmic structure 900 may include, at 908, determining whether non-SDT radio bearers are available for the non-SDT. For example, for NAS signaling, the AS layer determines whether one or more pre-configured non-SDT SRBs can be resumed from the suspended state. Similarly, for UL data, the AS layer determines whether one or more pre-configured non-SDT DRBs can be resumed from the suspended state. In both cases, the determination can also account for a priority of the non-SDT information and priorities associated with the suspended radio bearers. If the relevant radio bearer(s) is (are) available, the operational flow/algorithmic structure 900 proceeds to 910. Otherwise, the operational flow/algorithmic structure 900 proceeds to 920.

The operational flow/algorithmic structure 900 may include, at 910, transitioning the non-SDT radio bearer(s) to a resumed state. For example, the AS layer can select the one or more non-SDT SRBs or the one or more non-SDT DRBs, as applicable, and transition each from the suspended state to the resumed state. Further, RRC signaling can be performed such that the AS layer transitions to the RRC_CO-NNECTED state and the AS layer can indicate this transition to the NAS layer.

The operational flow/algorithmic structure 900 may include, at 912, transmitting the SDT information. For example, as applicable, the NAS signaling is transmitted over the resumed non-SDT SRB(s), whereas the UL data is transmitted over the resumed non-SDT DRB(s).

The operational flow/algorithmic structure 900 may include, at 920, initiating a service request procedure. For example, because no non-SDT SRB or non-SDT DRB, as applicable, is available for the non-SDT, the AS layer can trigger the NAS layer to initiate the service request procedure. In turn, the NAS layer can send a service request message to the network.

The operational flow/algorithmic structure 900 may include, at 922, receiving a SERVICE ACCEPT message. For example, this message is received from the network (e.g., from an AMF of the network) in response to the service request message. The SERVICE ACCEPT message can indicate that the AS layer is to transition to the RRC_CO-NNECTED state. Further, the SERVICE ACCEPT message can enable the UE to establish the relevant radio bearer(s) for the non-SDT.

The operational flow/algorithmic structure 900 may include, at 924, transitioning the AS layer to the RRC_CO-NNECTED state. For example, the AS layer performs the transition and indicates so to the NAS layer. The operational flow/algorithmic structure 900 can proceed to 912, where the non-SDT information is transmitted over the established non-SDT radio bearer(s).

Figure 10:
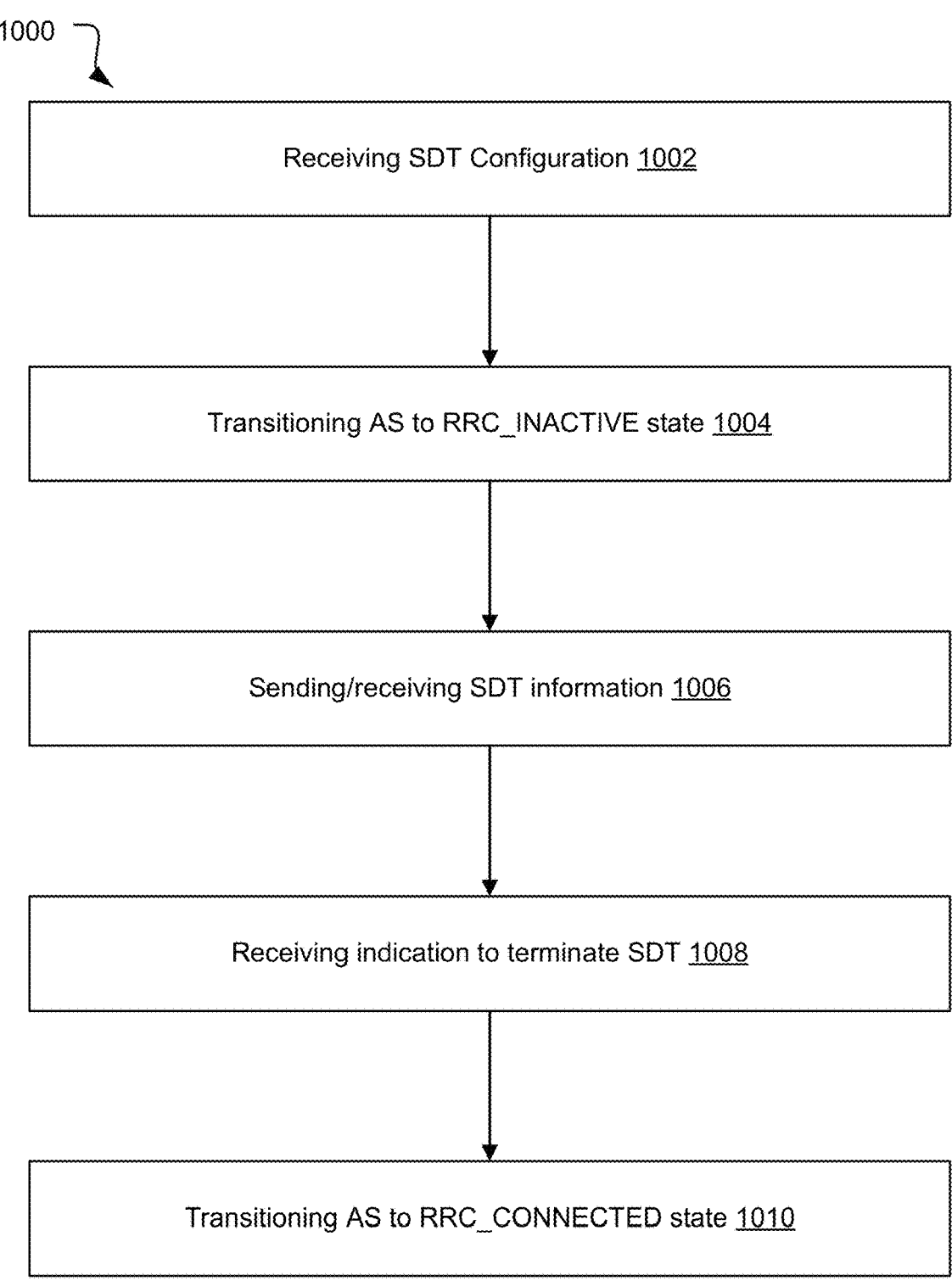
FIG. 10 illustrates an example of an operational flow/algorithmic structure for terminating SDT, in accordance with some embodiments.

FIG. 10 illustrates an example of an operational flow/algorithmic structure 1000 for terminating SDT, in accordance with some embodiments. The operational flow/algorithmic structure 1000 can be implemented for terminating SDT. The operational flow/algorithmic structure 1000 may include, at 1002, receiving an SDT configuration. For example, an AS layer of the UE receives configuration information from the network, where the configuration information is associated with SDT. The configuration information can indicate at least of an information size, an information priority, or a number of radio bearers to suspend. The configuration information can be included in a suspend indication, such as an RRCRelease message, or received along with such an indication and can be stored by the UE.

The operational flow/algorithmic structure 1000 may include, at 1004, transitioning the AS layer to an RRC_I-NACTIVE state. For example, in response to the suspend indication, the AS layer transitions from an RRC_CON-NECTED state to the RRC_INACTIVE state and indicates this transition to a NAS layer of the UE, where the NAS layer is in a 5GMM-CONNECTED mode. The NAS layer can transition to a 5GMM-CONNECTED mode with an RRC inactive indication. Further, the AS layer can suspend a number of SRBs and/or DRBS and terminate remaining radio bearers, except for SRB0 that is not suspended or terminated. This number can be the number indicated by the configuration information. Further, suspended SRBs and/or DRBs can be allocated a priority scheme based on priority information indicated by the configuration information.

The operational flow/algorithmic structure 1000 may include, at 1006, sending and/or receiving SDT information. For example, SDTs are performed while the NAS layer is in the 5GMM-CONNECTED mode with the RRC inactive indication and the AS layer is in the RRC_INACTIVE state based on the configuration information.

The operational flow/algorithmic structure 1000 may include, at 1008, receiving an indication to terminate SDT. For example, the AS layer receives an RRCRelease message from the network. This message can indicate that the configuration for SDT is no longer usable or available to the UE.

The operational flow/algorithmic structure 1000 may include, at 1010, transitioning the AS layer to an RRC_I-NACTIVE state. For example, in response to the RRCRelease message, the AS layer transitions from the RRC_I-

NACTIVE state to the RRC_CONNECTED state and indicates this transition to the NAS layer of the UE.

Figure 12:
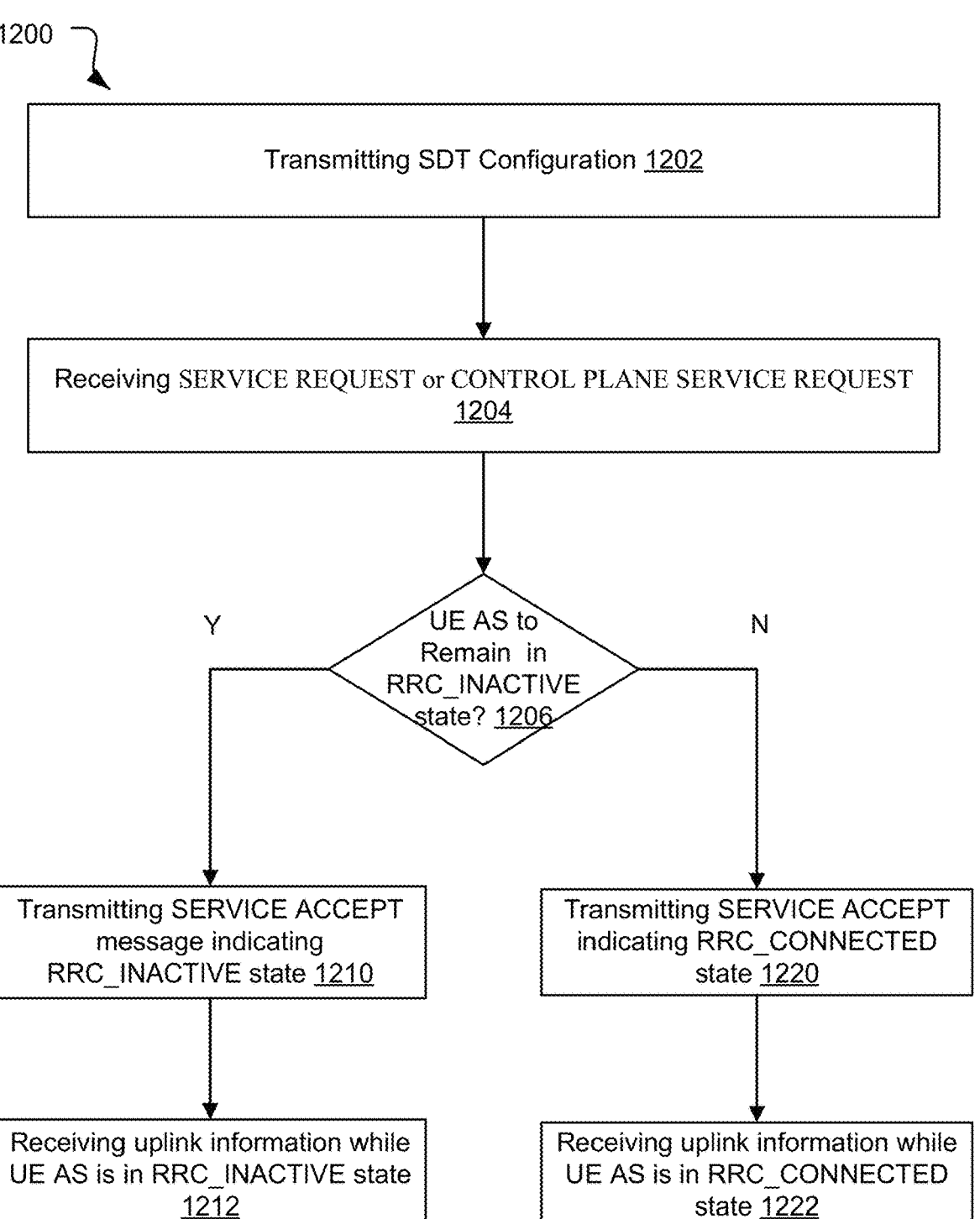
FIG. 12 illustrates another example of an operational flow/algorithmic structure for SDT using pre-configured radio bearers, in accordance with some embodiments.

FIGS. 11-12 illustrate examples of operational flows/algorithmic structures that can be implemented by a network in support of SDT, in accordance with some embodiments. The operational flows/algorithmic structure of FIG. 12 can represent a detailed implementation of aspects of the operational flows/algorithmic structure of FIG. 11. The network can be, for example, the 5GS 108, an AMF, a base station, or the operational flows/algorithmic structures can be implemented by components of the AMF and/or the base station such as one or more processors thereof.

FIG. 11 illustrates an example of an operational flow/algorithmic structure 1100 for supporting data transmission while a UE is in a connected mode and an inactive state, in accordance with some embodiments. The operation flow/algorithmic structure 1100 may include, at 1102, transmitting, while a non-access stratum (NAS) layer of a UE is in a fifth generation mobility management (5GMM)-CONNECTED mode, an indication to the UE to transition an access layer (AS) layer of the UE to a radio resource control (RRC)_INACTIVE state. For example, the network transmits a suspend indication, such as an RRCRelease message, to the UE based on UL traffic from or DL traffic to the UE (or lack thereof).

The operation flow/algorithmic structure 1100 may include, at 1104, transmitting to the UE a configuration defined for the NAS layer in the 5GMM-CONNECTED mode with an RRC inactive indication and the AS layer in the RRC_INACTIVE state. For example, configuration information can be included in the suspend indication or transmitted along with such an indication. The configuration information can indicate at least of an information size, an information priority, or a number of radio bearers to suspend.

The operation flow/algorithmic structure 1100 may include, at 1106, transferring, based on the configuration, information to or from the UE while the NAS layer is in the 5GMM-CONNECTED mode with the RRC inactive indication and the AS layer is in the RRC_INACTIVE state. For example, the information can be NAS signaling information or UL data that the UE has classified as SDT information based on the configuration. In this case, the network receives the SDT information over one or more SRBs or DRBs, as applicable, where such radio bearers were in a suspended state based on the configuration and were resumed by the UE. Further, the network may receive a SERVICE REQUEST or CONTROL PLANE SERVICE REQUEST message and respond with a SERVICE ACCEPT message indicating that the UE AS is to remain in the RRC_INACTIVE state. In another example, the information can be DL data. In this case, the network can transmit a paging message to the UE, where this message has a cause indicating that the DL data is classified as SDT data or indicating parameters of the DL data that the UE can compare to the configuration to then classify the DL data. Also in this case, the UE can resume a DRB from a suspended state to receive the DL data. In both examples, by remaining in the RRC_INACTIVE state, multiple SDTs can occur over time until either the UE indicates to the network a switch to non-SDT, the network indicates to the UE the switch to non-SDT, or the network terminates the SDT. In this case, the network can indicate to the UE to transition to an RRC_CONNECTED state and non-SDT radio bearers can be used for the transfer of information from that point on.

FIG. 12 illustrates another example of an operational flow/algorithmic structure 1200 for SDT using pre-configured radio bearers, in accordance with some embodiments. The operational flow/algorithmic structure 1200 can be implemented for receiving information from the UE. The operational flow/algorithmic structure 1200 may include, at 1202, transmitting an SDT configuration. For example, the network transmits, to the UE, configuration information defined for the 5GMM-CONNECTED mode and the RRC_INACTIVE state. This information can be included in a suspend indication, such as an RRCRelease message, or along with such an indication.

The operational flow/algorithmic structure 1200 may include, at 1204, receiving a SERVICE REQUEST or CONTROL PLANE SERVICE REQUEST message. For example, the network (e.g., AMF) receives the SERVICE REQUEST or CONTROL PLANE SERVICE REQUEST message from the NAS layer of the UE. Different triggers may exist for this message. For instance, the UE may have classified information to transmit to the network as SDT information and may have determined that no relevant pre-configured SDT radio bearer is available for the SDT.

The operational flow/algorithmic structure 1200 may include, at 1210, determining whether the UE AS is to remain in the RRC_INACTIVE state. For example, the network can perform this determination based on a number of factors including the amount (e.g., data size) of uplink traffic received from and/or scheduled by the UE within a time period. If this amount indicates that the uplink traffic is scarce and is small in size (e.g., based on the SDT configuration), the network can determine that the UE AS is to remain in the RRC_INACTIVE state. If so, the operational flow/algorithmic structure 1200 proceeds to 1210. Otherwise, the operational flow/algorithmic structure 1200 proceeds to 1220.

The operational flow/algorithmic structure 1200 may include, at 1210, transmitting a SERVICE ACCEPT message indicating the RRC_INACTIVE state. For example, the network (e.g., AMF) indicates to the UE that the AS layer is to remain in the RRC_INACTIVE state. Further, the relevant SDT radio bearer(s) can be established based on the service request message.

The operational flow/algorithmic structure 1200 may include, at 1212, receiving uplink information while the UE AS is in the RRC_INACTIVE state. For example, the uplink information can include SDT NAS signaling or SDT UL data and can be received over one or more SDT radio bearers.

The operational flow/algorithmic structure 1200 may include, at 1220, transmitting a SERVICE ACCEPT message indicating the RRC_CONNECTED state. For example, the network (e.g., AMF) indicates to the UE that the AS layer is to transition the RRC_CONNECTED state. Further, the relevant non-SDT radio bearer(s) can be established based on the service request message.

The operational flow/algorithmic structure 1200 may include, at 1222, receiving uplink information while the UE AS is in the RRC_CONNECTED state. For example, the uplink information can include non-SDT NAS signaling or non-SDT UL data and can be received over one or more non-SDT radio bearers.

Figure 13:
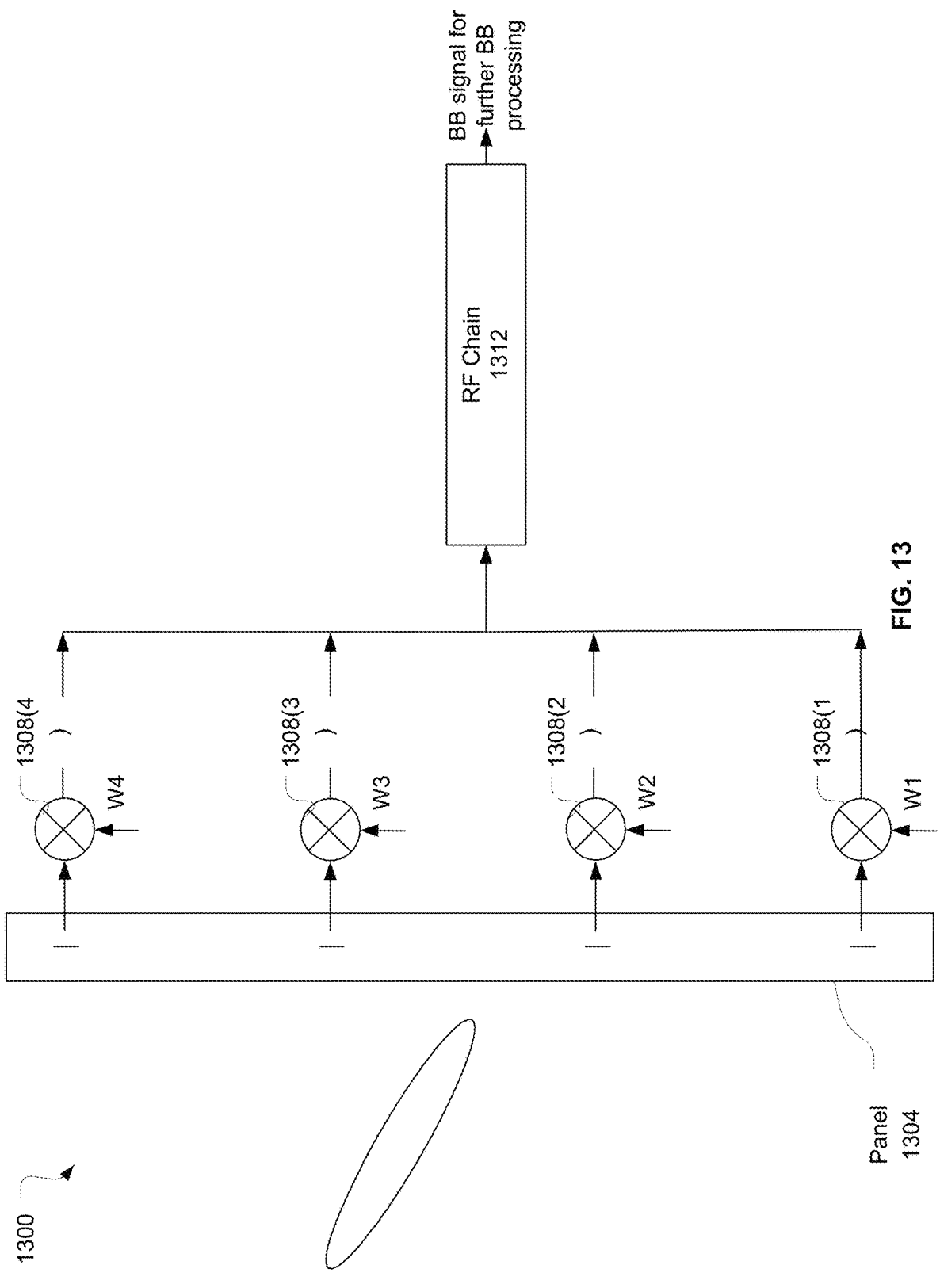
FIG. 13 illustrates an example of receive components, in accordance with some embodiments.

FIG. 13 illustrates receive components 1300 of the UE 104 in accordance with some embodiments. The receive components 1300 may include an antenna panel 1304 that includes a number of antenna elements. The panel 1304 is shown with four antenna elements, but other embodiments may include other numbers.

The antenna panel 1304 may be coupled to analog beamforming (BF) components that include a number of phase shifters 1308(1)-1308(4). The phase shifters 1308(1)-1308 (4) may be coupled with a radio-frequency (RF) chain 1312. The RF chain 1312 may amplify a receive analog RF signal, down convert the RF signal to baseband, and convert the analog baseband signal to a digital baseband signal that may be provided to a baseband processor for further processing.

In various embodiments, control circuitry, which may reside in a baseband processor, may provide BF weights (for example W1-W4), which may represent phase shift values to the phase shifters 1308(1)-1308(4) to provide a receive beam at the antenna panel 1304. These BF weights may be determined based on the channel-based beamforming.

Figure 14:
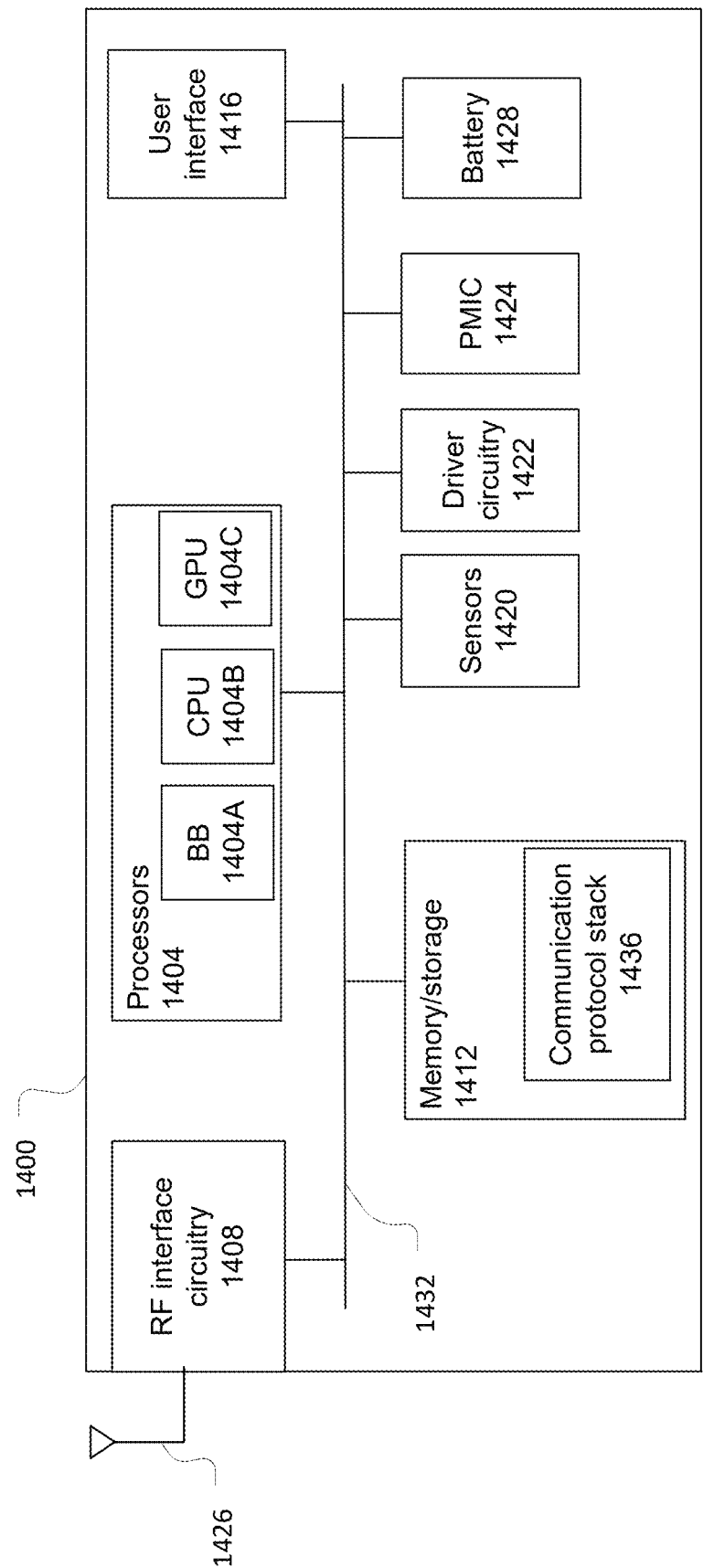
FIG. 14 illustrates an example of a UE, in accordance with some embodiments.

FIG. 14 illustrates a UE 1400 in accordance with some embodiments. The UE 1400 may be similar to and substantially interchangeable with UE 104 of FIG. 1.

Similar to that described above with respect to UE 104, the UE 1400 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, and actuators), video surveillance/monitoring devices (for example, cameras, and video cameras), wearable devices, or relaxed-IoT devices. In some embodiments, the UE may be a reduced capacity UE or NR-Light UE.

The UE 1400 may include processors 1404, RF interface circuitry 1408, memory/storage 1412, user interface 1416, sensors 1420, driver circuitry 1422, power management integrated circuit (PMIC) 1424, and battery 1428. The components of the UE 1400 may be implemented as integrated circuits (ICs), portions thereof, discrete electronic devices, or other modules, logic, hardware, software, firmware, or a combination thereof. The block diagram of FIG. 14 is intended to show a high-level view of some of the components of the UE 1400. However, some of the components shown may be omitted, additional components may be present, and different arrangements of the components shown may occur in other implementations.

The components of the UE 1400 may be coupled with various other components over one or more interconnects 1432 which may represent any type of interface, input/output, bus (local, system, or expansion), transmission line, trace, optical connection, etc. that allows various circuit components (on common or different chips or chipsets) to interact with one another.

The processors 1404 may include processor circuitry such as, for example, baseband processor circuitry (BB) 1404A, central processor unit circuitry (CPU) 1404B, and graphics processor unit circuitry (GPU) 1404C. The processors 1404 may include any type of circuitry or processor circuitry that executes or otherwise operates computer-executable instructions, such as program code, software modules, or functional processes from memory/storage 1412 to cause the UE 1400 to perform operations as described herein.

In some embodiments, the baseband processor circuitry 1404A may access a communication protocol stack 1436 in the memory/storage 1412 to communicate over a 3GPP compatible network. In general, the baseband processor circuitry 1404A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1408.

The baseband processor circuitry 1404A may generate or process baseband signals or waveforms that carry information in 3GPP-compatible networks. In some embodiments, the waveforms for NR may be based on cyclic prefix OFDM (CP-OFDM) in the uplink or downlink and discrete Fourier transform spread OFDM (DFT-S-OFDM) in the uplink.

The baseband processor circuitry 1404A may also access group information from memory/storage 1412 to determine search space groups in which a number of repetitions of a PDCCH may be transmitted.

The memory/storage 1412 may include any type of volatile or non-volatile memory that may be distributed throughout the UE 1400. In some embodiments, some of the memory/storage 1412 may be located on the processors 1404 themselves (for example, L1 and L2 cache), while other memory/storage 1412 is external to the processors 1404 but accessible thereto via a memory interface. The memory/storage 1412 may include any suitable volatile or non-volatile memory such as, but not limited to, dynamic random-access memory (DRAM), static random-access memory (SRAM), erasable programmable read-only memory (EPROM), electrically erasable programmable read-only memory (EEPROM), Flash memory, solid-state memory, or any other type of memory device technology.

The RF interface circuitry 1408 may include transceiver circuitry and a radio frequency front module (RFEM) that allows the UE 1400 to communicate with other devices over a radio access network. The RF interface circuitry 1408 may include various elements arranged in transmit or receive paths. These elements may include switches, mixers, amplifiers, filters, synthesizer circuitry, control circuitry, etc.

In the receive path, the RFEM may receive a radiated signal from an air interface via an antenna 1426 and proceed to filter and amplify (with a low-noise amplifier) the signal. The signal may be provided to a receiver of the transceiver that down-converts the RF signal into a baseband signal that is provided to the baseband processor of the processors 1404.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1426.

In various embodiments, the RF interface circuitry 1408 may be configured to transmit/receive signals in a manner compatible with NR access technologies.

The antenna 1426 may include a number of antenna elements that each convert electrical signals into radio waves to travel through the air and to convert received radio waves into electrical signals. The antenna elements may be arranged into one or more antenna panels. The antenna 1426 may have antenna panels that are omnidirectional, directional, or a combination thereof to enable beamforming and multiple input, multiple output communications. The antenna 1426 may include micro-strip antennas, printed antennas that are fabricated on the surface of one or more printed circuit boards, patch antennas, phased array antennas, etc. The antenna 1426 may have one or more panels designed for specific frequency bands including bands in FR1 or FR2.

The user interface circuitry 1416 includes various input/output (I/O) devices designed to enable user interaction with the UE 1400. The user interface 1416 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1400.

The sensors 1420 may include devices, modules, or subsystems whose purpose is to detect events or changes in its environment and send the information (sensor data) about the detected events to some other device, module, subsystem, etc. Examples of such sensors include inter alia, inertia measurement units comprising accelerometers; gyroscopes; or magnetometers; microelectromechanical systems or nanoelectromechanical systems comprising 3-axis accelerometers; 3-axis gyroscopes; or magnetometers; level sensors; flow sensors; temperature sensors (for example, thermistors); pressure sensors; barometric pressure sensors; gravimeters; altimeters; image capture devices (for example; cameras or lens-less apertures); light detection and ranging sensors; proximity sensors (for example, infrared radiation detector and the like); depth sensors; ambient light sensors; ultrasonic transceivers; microphones or other like audio capture devices; etc.

The driver circuitry 1422 may include software and hardware elements that operate to control particular devices that are embedded in the UE 1400, attached to the UE 1400, or otherwise communicatively coupled with the UE 1400. The driver circuitry 1422 may include individual drivers allowing other components to interact with or control various input/output (I/O) devices that may be present within or connected to the UE 1400. For example, driver circuitry 1422 may include a display driver to control and allow access to a display device, a touchscreen driver to control and allow access to a touchscreen interface, sensor drivers to obtain sensor readings of sensor circuitry 1420 and control and allow access to sensor circuitry 1420, drivers to obtain actuator positions of electro-mechanic components or control and allow access to the electro-mechanic components, a camera driver to control and allow access to an embedded image capture device, or audio drivers to control and allow access to one or more audio devices.

The PMIC 1424 may manage power provided to various components of the UE 1400. In particular, with respect to the processors 1404, the PMIC 1424 may control power-source selection, voltage scaling, battery charging, or DC-to-DC conversion.

In some embodiments, the PMIC 1424 may control, or otherwise be part of, various power saving mechanisms of the UE 1400. For example, if the platform UE is in an RRC_CONNECTED state, where it is still connected to the RAN node as it expects to receive traffic shortly, then it may enter a state known as Discontinuous Reception Mode (DRX) after a period of inactivity. During this state, the UE 1400 may power down for brief intervals of time and thus save power. If there is no data traffic activity for an extended period of time, then the UE 1400 may transition off to an RRC_IDLE state, where it disconnects from the network and does not perform operations such as channel quality feedback, handover, etc. The UE 1400 goes into a very low power state and it performs paging where again, it periodically wakes up to listen to the network and then powers down again. The UE 1400 may not receive data in this state; in order to receive data, it must transition back to RRC_CONNECTED state. An additional power saving mode may allow a device to be unavailable to the network for periods longer than a paging interval (ranging from seconds to a few hours). During this time, the device is totally unreachable to the network and may power down completely. Any data sent during this time incurs a large delay, and it is assumed the delay is acceptable.

A battery 1428 may power the UE 1400, although in some examples the UE 1400 may be mounted deployed in a fixed location and may have a power supply coupled to an electrical grid. The battery 1428 may be a lithium-ion battery, a metal-air battery, such as a zinc-air battery, an aluminum-air battery, a lithium-air battery, and the like. In some implementations, such as in vehicle-based applications, the battery 1428 may be a typical lead-acid automotive battery.

Figure 15:
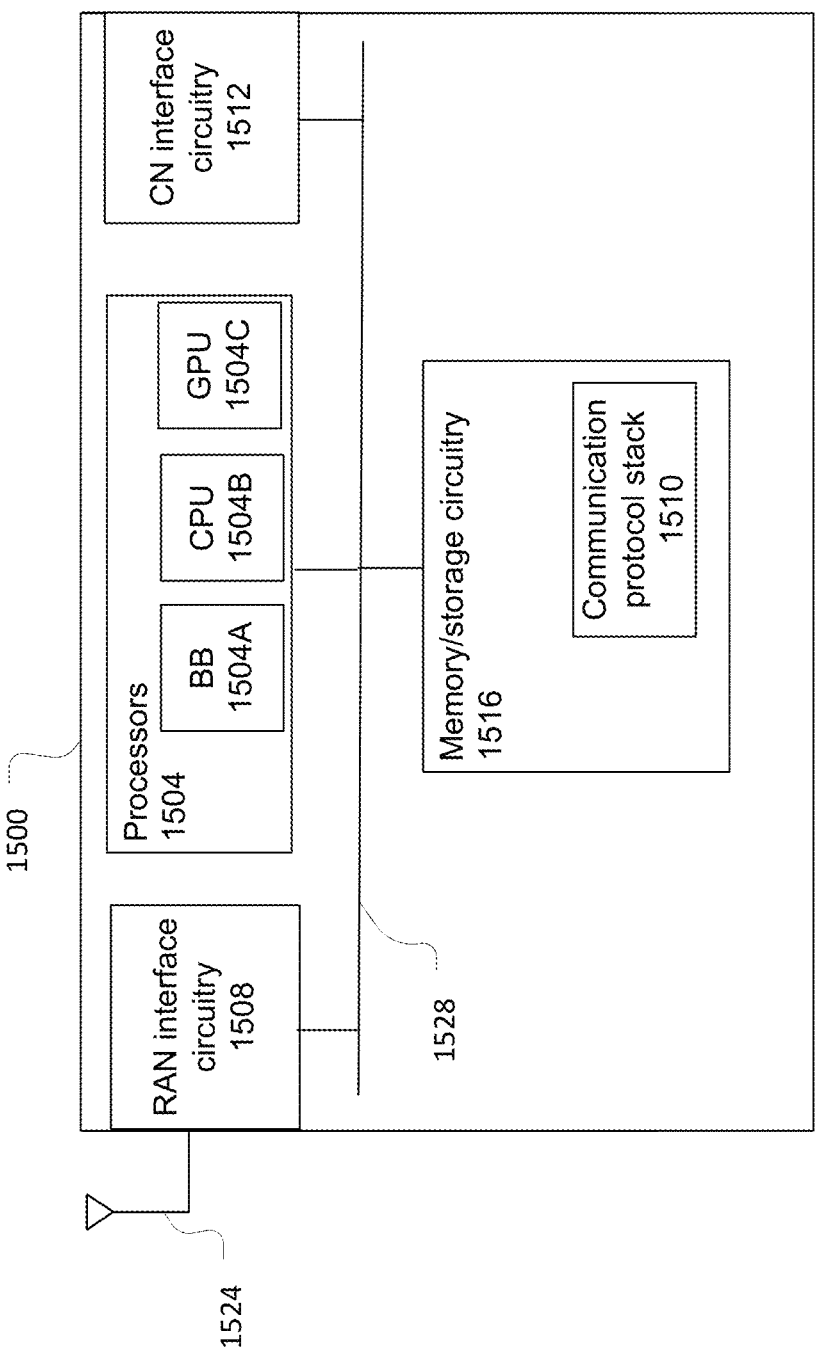
FIG. 15 illustrates an example of a base station, in accordance with some embodiments.

FIG. 15 illustrates a gNB 1500 in accordance with some embodiments. The gNB node 1500 may be similar to and substantially interchangeable with gNB 108.

The gNB 1500 may include processors 1504, RF interface circuitry 1508, core network (CN) interface circuitry 1512, and memory/storage circuitry 1516.

The components of the gNB 1500 may be coupled with various other components over one or more interconnects 1528.

The processors 1504, RF interface circuitry 1508, memory/storage circuitry 1516 (including communication protocol stack 1510), antenna 1524, and interconnects 1528 may be similar to like-named elements shown and described with respect to FIG. 13.

The CN interface circuitry 1512 may provide connectivity to a core network, for example, a 5$^{th}$ Generation Core network (5GC) using a 5GC-compatible network interface protocol, such as carrier Ethernet protocols or some other suitable protocol. Network connectivity may be provided to/from the gNB 1500 via a fiber optic or wireless backhaul. The CN interface circuitry 1512 may include one or more dedicated processors or FPGAs to communicate using one or more of the aforementioned protocols. In some implementations, the CN interface circuitry 1512 may include multiple controllers to provide connectivity to other networks using the same or different protocols.

It is well-understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry, as described above in connection with one or more of the preceding figures, may be configured to operate in accordance with one or more of the examples set forth below. For another example, circuitry associated with a UE, base station, network element, etc., as described above in connection with one or more of the preceding figures, may be configured to operate in accordance with one or more of the examples set forth below in the example section.

Examples

In the following sections, further exemplary embodiments are provided.

Example 1 includes a method implemented by a user equipment (UE), the method comprising: determining, while a non-access stratum (NAS) layer of the UE is in a fifth generation mobility management (5GMM)-CONNECTED mode with a radio resource control (RRC) inactive indication and an access stratum (AS) layer of the UE is in a RRC_INACTIVE state, that information is to be transferred to or from a network; transferring, while the NAS layer is in the 5GMM-CONNECTED mode with the RRC inactive indication and the AS layer is in the RRC_INACTIVE state, the information to or from the network based on a configuration defined for the NAS layer in the 5GMM-CONNECTED mode with the RRC inactive indication and the AS layer in the RRC_INACTIVE state; determining, after transferring the information, that the NAS layer is to remain in the 5GMM-CONNECTED mode with the RRC inactive indication and the AS layer is to remain in the RRC_INACTIVE state; and maintaining, after transferring the information, the NAS layer in the 5GMM-CONNECTED mode with the RRC inactive indication and the AS layer in the RRC_INACTIVE state.

Example 2 includes a method of example 1, further comprising: receiving, by the AS layer and while the NAS layer is in the 5GMM-CONNECTED mode and prior to a transition of the NAS layer to the 5GMM-CONNECTED mode with the RRC inactive indication and a transition of the AS layer to the RRC_INACTIVE state, the configuration from the network; and indicating, by the AS layer, the configuration to the NAS layer of the UE.

Example 3 includes a method of any preceding example, wherein the configuration indicates at least one of: an information size, an information priority, or a number of radio bearers to which the configuration applies.

Example 4 includes a method of any preceding example, further comprising: causing, by the AS layer, a signaling radio bearer zero (SRB0) to remain in an active state; causing, by the AS layer, a signaling radio bearer other than SRB0 to transition to a suspended state; and causing, by the AS layer, a data radio bearer (DRB), to transition to the suspended state.

Example 5 includes a method of any preceding example, wherein the information includes first uplink data, and further comprising: receiving, by the AS layer from the NAS layer, a first trigger to transfer the first uplink data; determining, by the AS layer, that the first uplink data has a classification associated with the configuration; and causing, by the AS layer while in the RRC_INACTIVE state, a transmission of the first uplink data on a data radio bearer (DRB).

Example 6 includes a method of example 5, further comprising: determining, by the AS layer, that the first uplink data is to be transmitted on the DRB; determining, by the AS layer, that the DRB has a suspended state; and causing, by the AS layer, the DRB to transition to a resumed state, wherein the first uplink data is transmitted while the DRB is in the resumed state.

Example 7 includes a method of example 6, further comprising: sending, by the AS layer to the NAS layer, an indication that the NAS layer is to remain in the 5GMM-CONNECTED mode with the RRC inactive indication while the AS layer remains in the RRC_INACTIVE state.

Example 8 includes a method of example 6, wherein the information includes second uplink data, and further comprising: receiving, by the AS layer from the NAS layer, a second trigger to transfer the second uplink data; determining, by the AS layer, that the second uplink data has the classification associated with the configuration; determining, by the AS layer, that the second uplink data is to be transferred on the DRB; and causing by the AS layer while in the RRC_INACTIVE state, a transmission of the second uplink data on the DRB in the resumed state.

Example 9 includes a method of example 6, further comprising: causing, by the AS layer, a signaling radio bearer one (SRB1) to transition from a suspended state to a resumed state; and causing, by the AS layer, a transmission of an RRC resume request on the SRB1 in the resumed state.

Example 10 includes a method of any preceding example, wherein the information includes uplink data, and further comprising: determining, by the AS layer, that a data radio bearer (DRB) is unavailable to transmit the uplink data; sending, by the AS layer to the NAS layer, a first trigger to initiate a service request procedure; receiving, by the AS layer from the NAS layer, a second trigger to transition to an RRC_CONNECTED state; receiving, by the AS layer from the network, a service accept message based on a service request procedure, wherein the service accept message indicates that the AS layer is to remain in the RRC_INACTIVE state; and sending, by the AS layer to the NAS layer, an indication that the NAS layer is to remain in the 5GMM-CONNECTED mode with inactive indication.

Example 11 includes a method of example 10, further comprising: causing, by the AS layer, the DRB to be established; and causing, by the NAS layer while in the 5GMM-CONNECTED mode with the RRC inactive indication, a transmission on the DRB.

Example 12 includes a method of any preceding example, wherein the information includes NAS signaling information, and further comprising: receiving, by the AS layer from the NAS layer, a first trigger to transfer the NAS signaling information; determining, by the AS layer, that the NAS signaling information has a classification associated with the configuration; and causing by the AS layer while in the RRC_INACTIVE state, a transmission of the NAS signaling information on a signaling radio bearer (SRB).

Example 13 includes a method of example 12, further comprising: setting, by the NAS layer, an access category of the NAS signaling information to mobile originated signaling.

Example 14 includes a method of any preceding example, wherein the information includes downlink data, and further comprising: receiving, from the network, a paging message indicating that the downlink data has a category that is associated with the configuration; transitioning a data radio bearer (DRB) from a suspended state to a resumed state; and receiving, while the NAS layer is in the 5GMM-CONNECTED mode with the RRC inactive indication and the AS layer is in the RRC_INACTIVE state, the downlink data on the DRB.

Example 15 includes a method of example 14, further comprising: sending, by the NAS layer, an indication that the downlink data is available.

Example 16 includes a method of any preceding example, wherein the information is first uplink data having a classification associated with the configuration, and further comprising: determining that second uplink data is to be transmitted to the network, wherein the second uplink data has a different classification that is unassociated with the configuration; determining that a data radio bearer (DRB) is available for a transmission of the second uplink data, wherein the DRB is in a suspended state; transitioning the DRB to a resumed state; and transmitting, while the NAS layer is in the 5GMM-CONNECTED mode with the RRC inactive indication and the AS layer is in the RRC_INACTIVE state, the second uplink data on the DRB.

Example 17 includes a method of any preceding example, wherein the information is first uplink data having a classification associated with the configuration, and further comprising: determining that second uplink data is to be transmitted to the network, wherein the second uplink data has a different classification that is unassociated with the configuration; determining that a data radio bearer (DRB) is unavailable for a transmission of the second uplink data; transitioning the AS layer to an RRC_CONNECTED state; and transmitting, while the NAS layer is in the 5GMM-CONNECTED mode and the AS layer is in the RRC_CONNECTED state, the second uplink data.

Example 18 includes a method of any preceding example, wherein the information is first uplink data having unified access control (UAC) parameter and a classification that is associated with the configuration, and further comprising: determining that second uplink data is to be transmitted to the network, wherein the second uplink data has a different classification that is unassociated with the configuration; and transmitting, to the network, the second uplink data based on the UAC parameter.

Example 19 includes a method of any preceding example, wherein the information is first uplink data having a classification associated with the configuration, and further comprising: determining that second uplink data is to be transmitted to the network, wherein the second uplink data has a different classification that is unassociated with the configuration; causing, by the AS layer of the UE, a transmission of the second uplink data; determining, by the AS layer, a failure of the transmission; and causing, by the AS layer, a retransmission of the second uplink data.

Example 20 includes a method of any preceding example, wherein the information is first uplink data having a classification associated with the configuration, and further comprising: determining that second uplink data is to be transmitted to the network, wherein the second uplink data has a different classification that is unassociated with the configuration; determining that a data radio bearer (DRB) is unavailable for a transmission of the second uplink data; transitioning the AS layer to an RRC_CONNECTED state; and transmitting, while in the NAS layer is in the 5GMM-CONNECTED mode and the AS layer is in the RRC_CONNECTED state, the second uplink data.

Example 21 includes a method of any preceding example, wherein the information is first uplink data having a classification associated with the configuration, and further comprising: receiving, by the AS layer of the UE, an RRC release message indicating a termination of information transfer that is based on the configuration; and indicating, by the AS layer to the NAS layer of the UE, the termination and an indication of a transition of the AS layer to an RRC_CONNECTED state.

Example 22 includes a method implemented by a network, the method comprising: transmitting, while a non-access stratum (NAS) layer of a UE is in a fifth generation mobility management (5GMM)-CONNECTED mode, an indication to the UE to transition an access layer (AS) layer of the UE to a radio resource control (RRC)_INACTIVE state; transmitting to the UE a configuration defined for the NAS layer in the 5GMM-CONNECTED mode with an RRC inactive indication and the AS layer in the RRC_INACTIVE state; and transferring, based on the configuration, information to or from the UE while the NAS layer is in the 5GMM-CONNECTED mode with the RRC inactive indication and the AS layer is in the RRC_INACTIVE state.

Example 23 includes a method of example 22, wherein the configuration indicates at least one of: an information size, an information priority, or a number of radio bearers to which the configuration applies, wherein the radio bearers include at least one of a data radio bearer (DRB) or a signaling radio bearer (SRB), and wherein the information includes at least one of uplink data or signaling information and is received on the at least one of the DRB or the SRB.

Example 24 includes a method of any preceding examples 22-23, wherein the information includes at least one of uplink data or signaling information, and further comprising: receiving, from the UE, a service request associated with a transition of the AS layer to an RRC_CONNECTED state; and sending, to the UE and based on the service request, an indication for the AS layer to remain in the RRC_INACTIVE state, wherein the at least one of the uplink data or the signaling information is received based on the indication.

Example 25 includes a method of any preceding examples 22-24, wherein the information includes downlink data, and further comprising: transmitting, to the UE, a paging message indicating that the downlink data has a category that is associated with the configuration, wherein the downlink data is transmitted to the UE based on the paging message.

Example 26 includes a method of any preceding examples 22-25, wherein the information is first uplink data having unified access control (UAC) parameter and a classification that is associated with the configuration, and further comprising: receiving, from the UE, second uplink data based on the UAC parameter, wherein the second uplink data has a different classification that is unassociated with the configuration.

Example 27 includes a UE comprising means to perform one or more elements of a method described in or related to any of the examples 1-21.

Example 28 includes one or more non-transitory computer-readable media comprising instructions to cause a UE, upon execution of the instructions by one or more processors of the UE, to perform one or more elements of a method described in or related to any of the examples 1-21.

Example 29 includes a UE comprising logic, modules, or circuitry to perform one or more elements of a method described in or related to any of the examples 1-21.

Example 30 includes a UE comprising: one or more processors and one or more computer-readable media comprising instructions that, when executed by the one or more processors, cause the one or more processors to perform one or more elements of a method described in or related to any of the examples 1-21.

Example 31 includes a system comprising means to perform one or more elements of a method described in or related to any of the examples 1-21.

Example 32 includes a network comprising means to perform one or more elements of a method described in or related to any of the examples 22-26.

Example 33 includes one or more non-transitory computer-readable media comprising instructions to cause a network, upon execution of the instructions by one or more processors of the network, to perform one or more elements of a method described in or related to any of the examples 22-26.

Example 34 includes a network comprising logic, modules, or circuitry to perform one or more elements of a method described in or related to any of the examples 22-26.

Example 35 includes a network comprising: one or more processors and one or more computer-readable media comprising instructions that, when executed by the one or more processors, cause the one or more processors to perform one or more elements of a method described in or related to any of the examples 22-26.

Example 36 includes a system comprising means to perform one or more elements of a method described in or related to any of the examples 22-26.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:

processing, at a user equipment (UE) side device, while operating in a fifth generation mobility management (5GMM)-CONNECTED mode with a radio resource control (RRC) inactive indication and in a RRC_I-NACTIVE state, a paging message of a network, the paging message indicating that transmission of downlink data is available and is to use one or more radio bearers configured for small data transmission (SDT);

initiating, at the UE side device, while operating in the 5GMM-CONNECTED mode with the RRC inactive indication and in the RRC_INACTIVE state, reception of the downlink data based on the paging message and a configuration, wherein the configuration is defined in association with the 5GMM-CONNECTED mode with the RRC inactive indication and with the RRC_INAC-TIVE state and indicates the one or more radio bearers to use for the reception;

determining, at the UE side device, after the downlink data is received, to continue operating in the 5GMM-CONNECTED mode with the RRC inactive indication and in the RRC_INACTIVE state;

processing, at the UE side device, a service accept message associated with a service request for transmitting data;

determining, at the UE side device, based on the service accept message, that the RRC_INACTIVE state is to be maintained; and continuing, at the UE side device, to operate in the 5GMM-CONNECTED mode with the RRC inactive indication and in the RRC_INACTIVE state.

2. The method of claim 1, further comprising:

processing, while operating in the 5GMM-CONNECTED mode and prior to a transition to the 5GMM-CON- NECTED mode with the RRC inactive indication and a transition to the RRC_INACTIVE state, the configuration from the network, wherein the configuration is indicated by an access stratum (AS) layer to a non-access stratum (NAS) layer.

3. The method of claim 1, wherein the configuration indicates at least one of: an information size, an information priority, or a number of radio bearers to which the configuration applies.

4. The method of claim 1, further comprising:

causing a signaling radio bearer zero (SRB0) to remain in an active state;

causing, a signaling radio bearer other than SRB0 to transition to a suspended state; and causing a data radio bearer (DRB), to transition to the suspended state.

5. The method of claim 1, further comprising:

determining a first trigger to transfer uplink data;

determining that the uplink data has a classification associated with the configuration; and causing, while in the RRC_INACTIVE state, a transmission of the uplink data on a data radio bearer (DRB).

6. The method of claim 1, further comprising:

determining that a data radio bearer (DRB) is unavailable to transmit uplink data;

initiating a service request procedure corresponding to the service request;

transitioning to an RRC_CONNECTED state;

processing the service accept message based on the service request procedure, wherein the service accept message indicates that the RRC INACTIVE state is to be maintained; and remaining in the 5GMM-CONNECTED mode with the RRC inactive indication.

7. The method of claim 1, further comprising:

determining a trigger to transfer non access stratum (NAS) signaling information;

determining that the NAS signaling information has a classification associated with the configuration; and causing, while in the RRC_INACTIVE state, a transmission of the NAS signaling information on a signaling radio bearer (SRB).

8. The method of claim 1, further comprising:

transitioning a data radio bearer (DRB) from a suspended state to a resumed state, wherein the downlink data is received on the DRB.

9. One or more non-transitory computer-readable media storing instructions that, upon execution operations comprising:

Processing, at a user equipment (UE) side device, while a non-access stratum (NAS) layer is in a fifth generation mobility management (5GMM)-CONNECTED mode with a radio resource control (RRC) inactive indication and an access stratum (AS) layer of a user equipment (UE) is in a RRC_INACTIVE state, a paging message of a network, the paging message indicating that transmission of downlink data is available and is to use one or more radio bearers configured for small data transmission (SDT);

initiating, at the UE side device, while the NAS layer is in the 5GMM-CONNECTED mode with the RRC inactive indication and the AS layer is in the RRC_I-NACTIVE state, reception of the downlink data based on the paging message and a configuration, wherein the configuration is defined in association with the 5GMM-CONNECTED mode with the RRC inactive indication and with the RRC_INACTIVE state and indicates the one or more radio bearers to use for the reception;

determining, at the UE side device, after the downlink data is received, that the NAS layer is to remain in the 5GMM-CONNECTED mode with the RRC inactive indication and the AS layer is to remain in the RRC_I-NACTIVE state;

processing, at the UE side device, a service accept message associated with a service request for transmitting data;

determining, at the UE side device, based on the service accept message, that the RRC_INACTIVE state is to be maintained; and maintaining, at the UE side device, the NAS layer in the 5GMM-CONNECTED mode with the RRC inactive indication and the AS layer in the RRC_INACTIVE state.

10. The one or more non-transitory computer-readable media of claim 9, wherein the operations further comprise:

determining that uplink data is to be transmitted to the network, wherein the uplink data has a different classification that is unassociated with the configuration;

determining that a data radio bearer (DRB) is available for a transmission of the uplink data, wherein the DRB is in a suspended state;

transitioning the DRB to a resumed state; and transmitting, while the NAS layer is in the 5GMM-CONNECTED mode with the RRC inactive indication and the AS layer is in the RRC_INACTIVE state, the uplink data on the DRB.

11. The one or more non-transitory computer-readable media of claim 9, wherein the operations further comprise:

determining that uplink data is to be transmitted to the network, wherein the uplink data has a different classification that is unassociated with the configuration;

determining that a data radio bearer (DRB) is unavailable for a transmission of the uplink data;

transitioning the AS layer to an RRC CONNECTED state; and transmitting, while the NAS layer is in the 5GMM-CONNECTED mode and the AS layer is in the RRC_CONNECTED state, the uplink data.

12. The one or more non-transitory computer-readable media of claim 9, wherein the operations further comprise:

determining that uplink data is to be transmitted to the network, wherein the uplink data has a different classification that is unassociated with the configuration; and transmitting, to the network while the NAS layer is in the 5GMM-CONNECTED mode with the RRC inactive indication and the AS layer is in the RRC_INACTIVE state, the uplink data based on a unified access control (UAC) parameter.

13. The one or more non-transitory computer-readable media of claim 9, wherein the operations further comprise:

determining that uplink data is to be transmitted to the network, wherein the uplink data has a different classification that is unassociated with the configuration;

causing, by the AS layer of the UE while the NAS layer is in the 5GMM-CONNECTED mode with the RRC inactive indication and the AS layer is in the RRC INACTIVE state, a transmission of the uplink data;

determining, by the AS layer, a failure of the transmission; and causing, by the AS layer, a retransmission of the uplink data.

14. The one or more non-transitory computer-readable media of claim 9, wherein the operations further comprise:

receiving, by the AS layer of the UE, an RRC release message indicating a termination of information transfer that is based on the configuration; and indicating, by the AS layer to the NAS layer of the UE, the termination and an indication of a transition of the AS layer to an RRC_CONNECTED state.

15. A method comprising:

generating, at a network side device and for transmission to a user equipment (UE) while a non-access stratum (NAS) layer of the UE is in a fifth generation mobility management (5GMM)-CONNECTED mode, an indication to the UE to transition an access stratum layer (AS) layer of the UE to a radio resource control (RRC) INACTIVE state;

generating, at the network side device and for transmission to the UE, a configuration defined for the NAS layer in the 5GMM-CONNECTED mode with an RRC inactive indication and the AS layer in the RRC_INACTIVE state, the configuration indicating radio bearers to use for small data transmission (SDT);

generating, at the network side device and for transmission to the UE, a paging message indicating that transmission of downlink data is available and is to use one or more of the radio bearers;

generating, at the network side device and for transmission the UE based on the configuration, the downlink data while the NAS layer is in the 5GMM-CONNECTED mode with the RRC inactive indication and the AS layer is in the RRC_INACTIVE state; and generating, at the network side device and for transmission the UE and based on a service request of the UE for uplink transmission, a service accept message, wherein the service accept message causes the UE to remain in the 5GMM-CONNECTED mode with the RRC inactive indication and in the RRC_INACTIVE state.

16. The method of claim 15, wherein the configuration indicates at least one of: an information size, an information priority, or a number of radio bearers to which the configuration applies, wherein the radio bearers include at least one of a data radio bearer (DRB) or a signaling radio bearer (SRB).

17. The method of claim 15, further comprising:

processing a service request of the UE, wherein the service request is associated with a transition of the AS layer to an RRC_CONNECTED state, and generating, for transmission to the UE and based on the service request, an indication for the AS layer to remain in the RRC INACTIVE state.

18. The method of claim 15, further comprising:

generating, for transmission to the UE, a paging message indicating that the downlink data has a category that is associated with the configuration, wherein the downlink data is transmitted to the UE based on the paging message.

19. The method of claim 1, wherein the paging message excludes an identifier of at least a radio bearer of the one or more radio bearers.

* * * * *